United States Patent [19]
Tanaka et al.

[11] Patent Number: 6,081,254
[45] Date of Patent: Jun. 27, 2000

[54] COLOR CORRECTION SYSTEM OF IMAGING APPARATUS

[75] Inventors: Mariko Tanaka, Oota-ku; Shinichi Yamada, Kawasaki; Tomoko Ogawa, Kodaira; Yuji Sano, Zushi; Kiyoharu Kishimoto, Yokohama; Takuya Imaide; Michitaka Ohsawa, both of Fujisawa; Eiichi Yamazaki, Chiba; Masaaki Kurosu, Choufu; Hitoshi Yamadera; Takeshi Hoshino, both of Kokubunji; Hiroshi Koizumi, Sumida-ku; Moritaka Taniguchi, Tachikawa; Kouji Kitou; Ikuya Arai, both of Yokohama, all of Japan

[73] Assignee: Hitachi, Ltd., Tokyo, Japan

[21] Appl. No.: 08/288,698

[22] Filed: Aug. 12, 1994

[30] Foreign Application Priority Data

Aug. 12, 1993 [JP] Japan ................................ 5-200514
Dec. 10, 1993 [JP] Japan ................................ 5-310101

[51] Int. Cl.[7] .................................................. G09G 5/04
[52] U.S. Cl. .......................... 345/154; 345/207; 345/431; 345/153; 358/518
[58] Field of Search .................................. 345/207, 153, 345/154, 199, 904, 431, 150; 358/518, 523, 525, 515; 348/647, 630, 650

[56] References Cited

U.S. PATENT DOCUMENTS

| | | | |
|---|---|---|---|
| 4,379,292 | 4/1983 | Minato et al. ............................ | 345/207 |
| 4,843,573 | 6/1989 | Taylor et al. ............................. | 345/431 |
| 4,926,251 | 5/1990 | Sekizawa et al. ........................ | 358/535 |
| 5,394,167 | 2/1995 | Migny ....................................... | 345/207 |
| 5,434,595 | 7/1995 | Macaulay ................................. | 345/207 |
| 5,489,921 | 2/1996 | Dorff et al. .............................. | 345/153 |
| 5,502,458 | 3/1996 | Braudaway et al. .................... | 345/153 |
| 5,526,058 | 6/1996 | Sano et al. ............................... | 345/647 |
| 5,579,031 | 11/1996 | Liang ....................................... | 345/154 |

FOREIGN PATENT DOCUMENTS

| | | |
|---|---|---|
| 1-147989 | 6/1989 | Japan . |
| 2-22523 | 1/1990 | Japan . |

*Primary Examiner*—Richard A. Hjerpe
*Assistant Examiner*—Francis Nguyen
*Attorney, Agent, or Firm*—Antonelli, Terry, Stout & Kraus, LLP

[57] ABSTRACT

The present invention is a color correction system including an imaging apparatus which inputs or outputs an image signal from a signal processor into or from an image device such as an input device such as a scanner or a camera or an output device such as a display device or a print device and which is constituted so as to correct colors by inputting or outputting image signals via a color converter, the conversion characteristic of which can be controlled according to a variation in the setting status or use environment of the imaging apparatus and faithful color reproduction can be realized between a plurality of imaging apparatuses having different characteristics.

45 Claims, 22 Drawing Sheets

COLOR CORRECTION SYSTEM OF IMAGING APPARATUS

BACKGROUND OF THE INVENTION

1. Field of the Invention

The present invention relates to a color correction system having a converter which can correct image colors handled by an imaging apparatus and a color reproduction system which can realize faithful color reproduction and ensure high reliability of transfer color data among light source colors such as displayed colors and non-luminous object colors such as reflected colors and transmitted colors.

2. Description of the Prior Art

As order receiving systems for various kinds of products have been computerized recently, opportunities of deciding colors of products by using image data on a monitor display screen have been increased. Therefore, development of an imaging apparatus and system which can faithfully transmit and reproduce displayed colors on the monitor display screen is expected.

As a method for faithfully reproducing displayed colors on the monitor display screen, a method for converting input signals equivalent to the light source colors displayed on the monitor display screen to color parameters (tristimulus values determined by CIE (Commission Internationale de l'Eclairage)) of the non-luminous object colors which are the colors of a product is known. For example, the mutual conversion method disclosed in Japanese Patent Application Laid-Open No. 2-22523 will be explained with reference to FIG. 2. In FIG. 2, a color comparison environment in which an observer 213 can observe a color matching area 209 in an achromatic color background 208 on the display screen of a CRT display 207 and a standard color chip 212 in an achromatic color object background 211 which is lighted by an illuminator 210 at the same time is provided. A light shielding board 214 is installed so as to prevent the CRT display 207 from irradiation of the illuminating light of the illuminator 210. Input signals into the CRT display 207 can be adjusted so that the color of the color matching area 209 matches the color of the standard color chip 212 in visual observation by the observer 213. In this color comparison environment, the mutual conversion method between the CIE tristimulus values of the standard color chip 212 which are known and the above input signals into the CRT display 207 is proposed by the chromaticity of luminescent material on the CRT display 207 and linear operation of the function expression of the gamma-th power characteristics. Furthermore, other inventions of the applicant which are related to the present invention are disclosed in Japanese Patent Application Laid-Open Nos. 5-69574 and 6-17998 (U.S. patent application Ser. No. 08/219,271, now U.S. Pat. No. 5,526,058).

For the art of color correction, design creation using a computer graphic apparatus is executed in various industrial fields such as cloth and accessory, apparel, automobile, domestic electric appliances, printing, and others. In these uses, not only rough color designing but also final designing or up to decision of design colors in a stage close to it are being increasingly often executed on a computer graphic apparatus.

Therefore, an art for eliminating a difference between a color on the color display screen of a computer graphic apparatus or on a printing paper of a color printer which is decided by visual evaluation of a designer and a color displayed on an actual trial product or on a product obtained by manufacture so as to produce the same color and for facilitating decision of a color by visual evaluation of a designer is necessary (when there is a difference between them such that they are not the same color, it is necessary to decide a color by visual evaluation in anticipation of the difference, so that the operation of visual evaluation will be much more complicated).

As one of the aforementioned arts, a system which can precisely control and define a color of a color display is disclosed in Japanese Patent Application Laid-Open No. 1-147989 (Japanese Patent Publication No. 4-44277) which corresponds to U.S. Pat. No. 4,843,573. This prior art will be explained hereunder with reference to FIG. 10. FIG. 10 is a block diagram showing the schematic constitution of a computer graphic apparatus. In the drawing, the computer graphic apparatus is constructed by connecting a color display 801 using a color CRT (cathode ray tube) 802 to a graphics workstation 805 including an input device 810 such as a keyboard, a programmable processor 808, and a memory 809 as shown in the drawing.

A user realizes and calculates a color space using the graphics workstation 805 and can designate the display color on the color CRT 802 by inputting color space coordinates from the input device 810. The color space used by this prior art is a uniform color space on the basis of the international standard system of the Commission Internationale de l'Eclairage (CIE) and indicates a perceptively uniform color change for a change in the color coordinates. When the display color to be displayed on the color CRT 802 is inputted from the input device 810, by predicting a color change (mismatch) between the displayed color on the color CRT 802 and the actual color which is calculated and realized by the graphics workstation 805 to a certain extent, the user can select the color efficiently on the input device 810.

In the aforementioned conventional example relating to a color reproduction system, although the color comparison environment is provided, a judgment of color matching is executed on the basis of visual comparison between colors. Therefore, there is a worry about variations in color matching accuracy between the light source color on the monitor display screen and the non-luminous object color due to the effect of the dependency of an observer for judgment of color matching. The dependency on the color comparison environment and imaging apparatus cannot be ignored and a problem of deterioration of color reproduction relating to color matching due to variations per hour of the imaging apparatus or variations in products arises. Particularly when transfer color data or retention color data is reproduced, there is a worry about remarkable reduction of the reliability of reproduced colors.

Color selection on the input device 810 according to the aforementioned prior art relating to a color correction system is based on the color coordinates or each primary color luminance data stored in the memory 809 and gradation correction, white balance adjustment, and variations in the luminescent material of the color CRT 802 are anticipated in the data. However, although the data may be calibrated periodically after it is set before the computer graphic apparatus is delivered from the factory, it is little compensated for the setting status of the color display 801 by the user and changes in the use environment.

Therefore, when a plurality of colors coexist as displayed colors like in a case wherein a natural picture is displayed on the color display 801, it is very difficult to reproduce each color faithfully. Furthermore, on the assumption that the reproduced color for the same color data is different between different kinds of imaging apparatuses which handle color images, it is necessary that a user makes a color design by keeping the corresponding color corresponding to the color data in mind.

SUMMARY OF THE INVENTION

To solve the above problems, an object of the present invention is to provide a system which can realize faithful color reproduction independently of an image apparatus and ensure the high reliability of color data among light source colors such as displayed colors and non-luminous object colors such as reflected colors and transmitted colors of the imaging apparatus.

Another object of the present invention is to provide an imaging apparatus having a means for compensating for a change which is caused in the reproduced color (displayed color) depending on a change in the setting status or use environment in an imaging apparatus such as a color display and for displaying the correct color and a means for realizing faithful reproduction of the same color for the same color data between a plurality of imaging apparatuses of different kinds and a color correction system including such imaging apparatuses.

To accomplish the above objects, the present invention is a color correction system for an imaging apparatus which has at least one of an imaging apparatus for detecting the color of at least one point of an object and an imaging apparatus for outputting image information, a conversion means for converting the color information of an input-output signal of the imaging apparatus on the basis of the color conversion characteristic of the imaging apparatus, a detection means for detecting at least one status value among the color information of an input-output signal of the imaging apparatus, at least one adjustment status set value of the imaging apparatus, and at least one status value indicating at least the variation per year of the color conversion characteristic and the use environment of the imaging apparatus, and a control means for controlling the color information of the input-output signal of the imaging apparatus by controlling the color conversion characteristic of the above conversion means on the basis of an output signal of the above detection means.

More concretely, the object for executing the above color reproduction faithfully is accomplished by connecting the output unit of a color data retention means having color data which is a reference value for the light source color and non-luminous object color to the control means via the conversion means in a color reproduction system for inputting or outputting an image signal handled by the imaging apparatus, connecting the detection means for detecting the image color inputted or outputted by the imaging apparatus to it, and connecting the output unit of the control means to the input unit of the conversion means. By doing this, the present invention performs the following characteristic operation.

Among these means, the conversion means converts different image signals before and after the conversion means so as to reproduce the image color handled by the imaging apparatus faithfully. The color data retention means retains color data which is a reference value for the light source color and non-luminous object color and supplies the color data to the control means whenever necessary. The control means compares the image color or image signal detected by the detection means with the color data and controls an output signal of the conversion means so as to make them equal to each other.

By installing these means, the image color handled by the imaging apparatus can be made equal to the color which is referred to on the basis of the color data. Therefore, the image color handled by the imaging apparatus can be reproduced faithfully.

To accomplish the above objects relating to a color correction system and others, in an imaging apparatus which includes image input and output devices such as a display device and print device, fetches a given image signal from an image signal processing means and outputs it to the image output device, and outputs an image signal fetched from the image input device to the image signal processing means, the present invention outputs the given image signal from the image signal processing means to the image output device via a converter (color converter) which can correct a color change which is caused by a change in the color display characteristic of the imaging apparatus or outputs the image signal fetched by the image input device to the image signal processing means via the converter. By doing this, the present invention performs the following characteristic operation.

In the imaging apparatus of the present invention, a user inputs or outputs an image signal in the format desired by him using the image input or output device. The converter installed in the imaging apparatus converts an inputted or outputted image signal using the conversion characteristic corresponding to a change in the setting status or use environment of the imaging apparatus so as to improve the faithful color reproduction of an image signal which is inputted or outputted by the input or output device. By improving the color reproduction of each imaging apparatus like this, a color correction system which can also realize faithful color reproduction between a plurality of imaging apparatuses can be provided.

The foregoing and other objects, advantages, manner of operation and novel features of the present invention will be understood from the following detailed description when read in connection with the accompanying drawings.

DETAILED DESCRIPTION OF THE PREFERRED EMBODIMENTS

The present invention will be explained in detail hereunder using the embodiments. However, the present invention is not limited to the embodiments indicated below.

Embodiment 1

Figure 1:
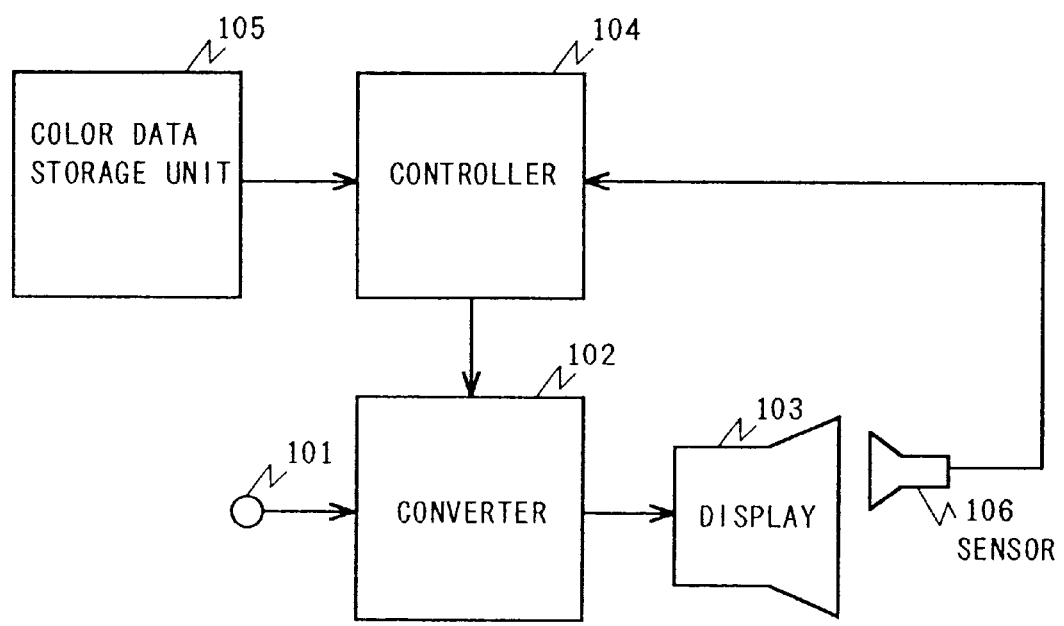
FIG. 1 is a block diagram showing the first embodiment of the high fidelity color reproduction system of the present invention.
Figure 2:
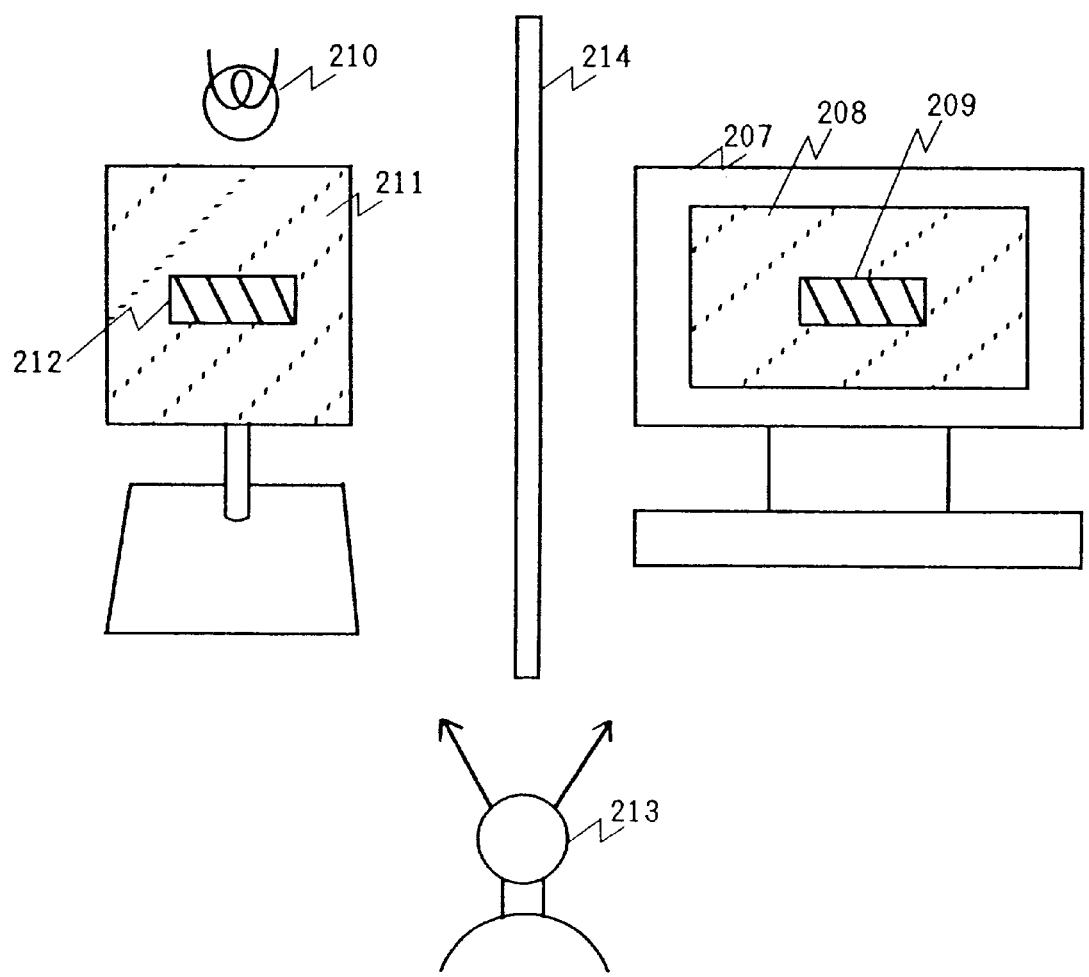
FIG. 2 is a schematic view showing a conventional example.

FIG. 1 is a block diagram showing the basic system of the present invention. In FIG. 1, a display signal inputted from a terminal 101 is converted by a converter 102 and then supplied to a display 103 so that faithful color reproduction is performed by the display 103. Needless to say, the terminal 101 is not limited to a single terminal as shown in the drawing and it may represent three input terminals for signals of three primary colors of red, blue, and green. The same may be said with the other terminals shown in FIG. 1. When faithful reproduction of displayed color is unimportant such as when the display 103 is used as a character monitor display, merely by supplying a display signal to the display 103 via the converter 102 as mentioned above, sufficient practical use can be obtained. However, when the display 103 is used for an order receiving system of various kinds of products as a graphic monitor display, an imaging apparatus and system which can faithfully transmit and reproduce the displayed color on the monitor display screen are necessary. However, as mentioned above, deterioration of color reproduction relating to color matching depending on product variations and variations per year between the imaging apparatuses is inevitable. Therefore, in FIG. 1, a controller 104 for controlling the conversion characteristic of the converter 102 is provided so as to compensate for the above deterioration of color reproduction. Namely, a sensor 106 for detecting the displayed color on the display 103 and a color data storage unit 105 for storing color data which is a reference value for the light source color and non-luminous object color are provided and the output terminals thereof are connected to the input terminals of the controller 104. The conversion characteristic of the converter 102 is corrected so as to make the output of the sensor 106 and the reference value output of the color data storage unit 105 equal to each other. In this case, the reference value output of the color data storage unit 105 may be corrected according to the system use status so as to obtain faithful color reproduction necessary for a user. By doing this, an imaging apparatus and system which can faithfully transmit and reproduce the displayed color on the monitor display screen by compensating for the deterioration of color reproduction relating to color matching depending on product variations and variations per year between the imaging apparatuses can be provided.

As color data stored in the color data storage unit 105, chromaticity such as Munsell or Ostwald color chips which are standards for the non-luminous object color can be considered. For example, it can be considered to digitize a parameter of XYZ tristimulus values in a CIE calorimetric system corresponding to each color chip number of the Munsell color chips. Therefore, existing parameters such as the above XYZ tristimulus values in the CIE colorimetric system, luminance (or a value converted from lightness), xy or uv chromaticity, and ab chromaticity can be used. Optional color parameters which are not standardized internationally also can be used. Since this digital data is a discrete value, when an intermediate value of data is inputted into the converter 102, it is converted by interpolation.

Embodiment 2

An operation example when the displayed color is faithfully reproduced will be explained using Embodiment 1. The present invention represents the color parameter of a Munsell color chip which is a standard of the non-luminous object color by digital data and fetches the digital data into the controller 104 using a CPU. The present invention inputs the display signal which is to be matched with the above Munsell color chip from the terminal 101 and reproduces it, for example, on the CRT of the display 103. The present invention detects the light source color reproduced on the CRT with the sensor 106 and then feeds it back to the controller 104 and compares it with the above digital data. The present invention checks whether a color which is the same as that indicated by the Munsell color chip is reproduced. When there is an error, the present invention corrects the conversion characteristic of the converter 102 in consideration of the error. For example, the present invention changes a coefficient of a conversion expression. By using the correction procedure on the basis of this Munsell color chip, the deterioration of color reproduction relating to color matching of the display 103 depending on product variations and variations per year can be compensated for.

Embodiment 3

In FIG. 1, an example that the present invention is applied to a correction of the display 103 is shown. However, the present invention can be applied to not only the display but also to various kinds of imaging apparatuses such as a printer and scanner. Such a case will be explained hereunder. Namely, the display 103 is replaced with the above imaging apparatus, for example, a printer, and the print result is detected by the sensor 106 and fed back to the controller 104, and the conversion characteristic of the converter 102 can be corrected. When the display 103 is replaced with a color scanner, by fetching the colors of the correction standard chips on which the Munsell color chips which are the standard data of the color data storage unit 105, color bars and a gray scale are recorded, the sensor 106 can be omitted. The present invention also may be applied to all other imaging apparatuses.

Embodiment 4

A case wherein a display signal beyond the color reproduction range of the displayed color on the display 103 is inputted into the converter 102 or a case wherein converter control such that even the displayed color requiring a display guarantee is beyond the above color reproduction range is applied will be explained hereunder. If this occurs, a flag signal is generated as a warning to a user. As a method far preventing deviation from the color reproduction range, it can be considered to compress and convert the whole color reproduction range of the displayed color included in the display signal to the color reproduction range of the displayed color on the display 103. As a compression conversion method for the color reproduction range, linear conversion with a displayed white as the conversion center or non-linear conversion including gradation correction is possible.

As a use environment of the display, the illumination environment, ambient environment, and effect of dependency on an observer may be considered. Repeatability in experiments equivalent to the color comparison environment in the aforementioned conventional example will not be obtained generally in the practical use state.

Embodiment 5

Figure 3:
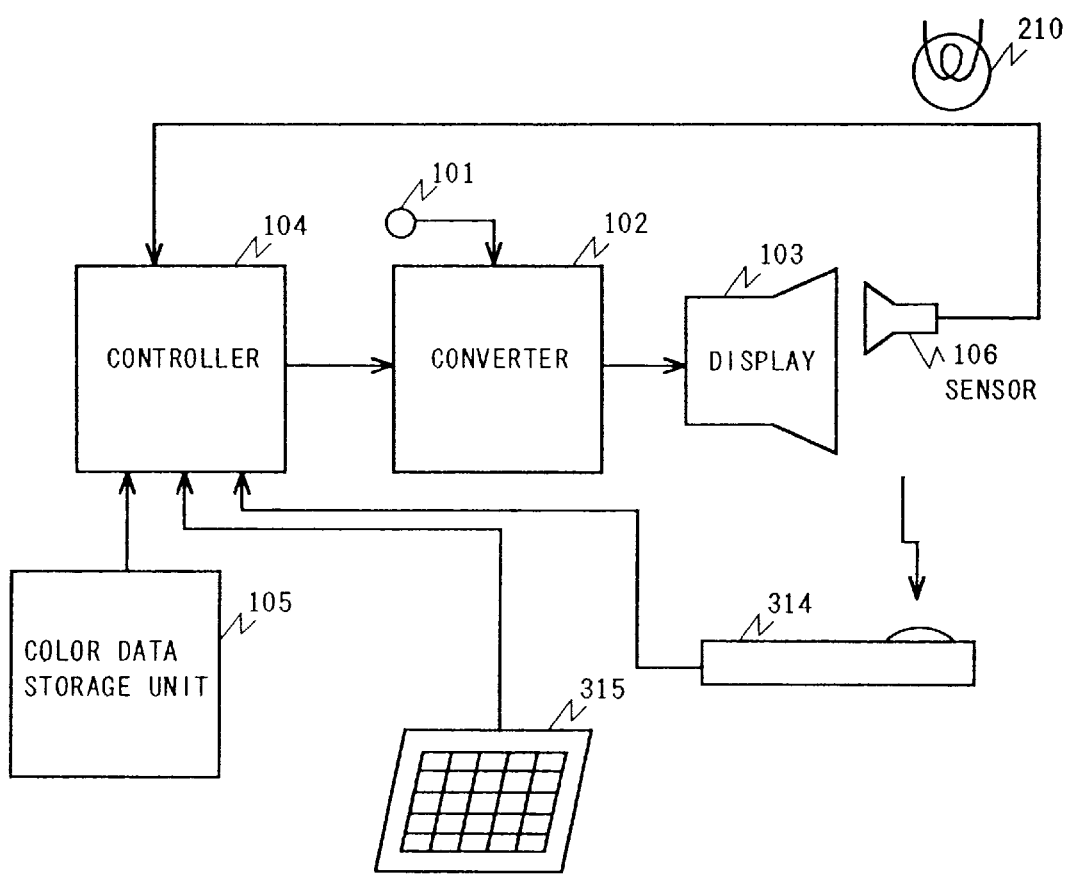
FIG. 3 is a block diagram showing the second embodiment of the high fidelity color reproduction system of the present invention.

A case wherein the effect of use environment of the display can be compensated for is shown in FIG. 3. In FIG. 3, an illuminometer or photosensor 314 for illumination environment detection is connected to the controller 104. When the illuminometer or the photosensor 314 is installed on the table where the display 103 is used or in the neighborhood of the display screen of the display 103, the intensity and color of the direct light or reflected light from the illuminator 210 or external light can be measured. The aforementioned sensor 106 can be used as the illuminometer or photosensor 314. It can be also considered to use a keyboard 315, bar code reader, or mouse so as to input the use environment of the display 103. The controller 104 corrects the conversion characteristic of the converter 102 so as to compensate for the use environment of the display 103. In FIG. 3, both the illuminometer or photosensor 314 and the keyboard 315 are connected to the controller 104. However, they may be connected to the converter 102 and the display 103 via a conversion unit for an environment input signal.

Embodiment 6

Figure 4:
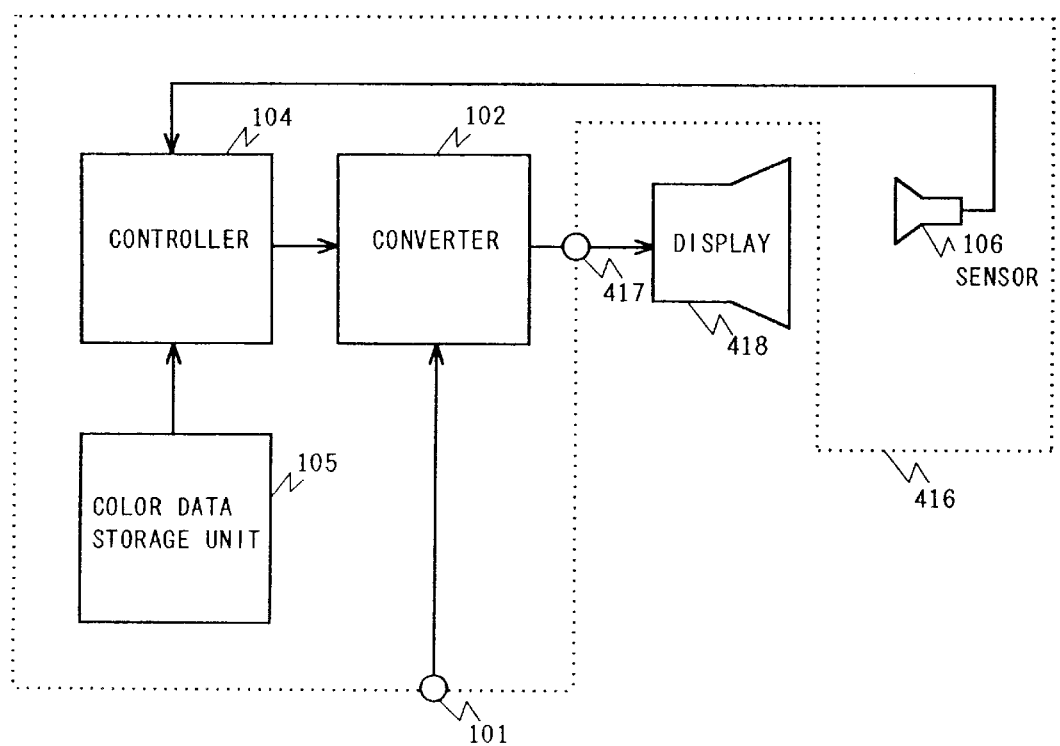
FIG. 4 is a block diagram showing the third embodiment of the high fidelity color reproduction system of the present invention.

The system of the present invention not only can compensate for the deterioration of color reproduction relating to color matching depending on product variations and variations per year between each imaging apparatus such as the display but also can compensate for reproduction of the same color on different imaging apparatuses which do not depend on the machine kind and manufacturer. Therefore, as shown in FIG. 4, a constitution which uses the constitution enclosed by a dashed line 416 as a common system and is provided with an output terminal 417 in addition to the input terminal 101 so that an optional imaging apparatus 418 can be connected may be considered. In this case, among displays using optional CRTs which vary with the machine kind and manufacturer and different displays using liquid crystal and plasma display boards, the same color can be reproduced. Furthermore, by using a detector which can detect both the light source color and non-luminous object color of a video camera or color sensor containing a light source for illumination as a sensor 106, even if different imaging apparatuses such as an optional display and an optional printer are combined, reproduction of the same color can be realized.

Embodiment 7

As another constitution of the present invention, a black box of the converter 102 shown in FIGS. 1, 3, and 4 can be considered. For example, a parameter which manages the conversion characteristic corresponding to each imaging apparatus is stored in a storage medium such as a CD-ROM or floppy disk and commercialized. Data including the above parameter which is read is subjected to protect processing so as to ensure the maintainability of the system. The above storage medium is sold, for example, as an optional product for further improvement in picture quality and expansion of application of each imaging apparatus. Therefore, the unique characteristics of each imaging apparatus manufacturer can be made available to users. The present invention or a system based on it is marketable as a part of utility software. Furthermore, for trial manufacture or new development by modification of the present invention or a system based on it, a non-volatile PPROM can be created and unique data of the user can be stored in it. An LSI of as much of the system constitution as possible including the converter and the peripheral unit thereof can be realized, so that the cost at mass production is reduced and the commodity value is increased.

Embodiment 8

Figure 5:
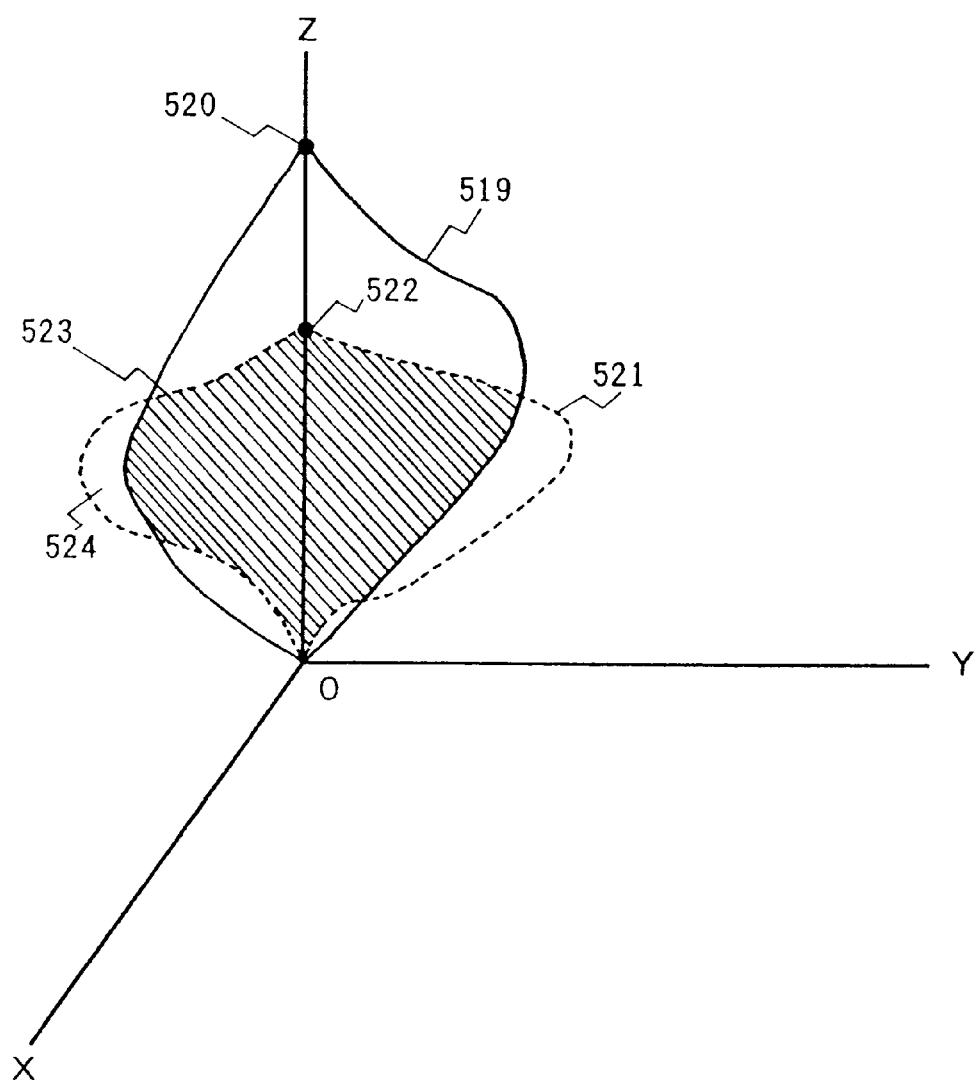
FIG. 5 is a color space drawing showing an embodiment of color conversion of the high fidelity color reproduction system of the present invention.

An example when the present invention is examined from another viewpoint is shown in FIG. 5. FIG. 5 shows an optional color space. For example, the XY plane in the drawing is equivalent to a chromaticity plane and the Z axis is equivalent to a luminance or lightness axis (luminance and lightness can be converted equivalently to each other). In this case, the cross section of the YZ plane of the color reproduction range of the display 103 shown in FIG. 1 is an area enclosed by a solid line 519. The cross section of the YZ plane of the color range to be displayed is an area enclosed by a dashed line 521. The operation of the system of the present invention is to faithfully reproduce only the colors included within the color reproduction range of the display 103 among the color range to be displayed. The above operation on the YZ plane shown in FIG. 5 can be explained as follows: Only the area indicated by a hatched area 523 which is enclosed by both the solid line 519 and the dashed line 521 is reproduced faithfully. Even when a change in the use environment such as product variations or variations per year of the display which is an imaging apparatus or variations of the illuminating light occurs, the above faithful reproduction can be maintained for each color within the color reproduction range. Needless to say, the maintenance precision of the above faithful reproduction is within the perception precision and tolerance of a human who is a user. However, as shown in FIG. 5, the color range to be reproduced is generally beyond the color reproduction range of an imaging apparatus (the display 103 in the above case) and the color reproduction capacity of the imaging apparatus as a system cannot be used fully. For example, it can be considered that a deviation range indicated by an area 524 shown in FIG. 5 exists or a maximum luminance color 522 to be reproduced is lower in luminance than a maximum luminance color 520 of the imaging apparatus. By using the color reproduction capacity of the imaging apparatus as a system fully, a relative color comparison can be performed easily for a plurality of objects even if faithful color reproduction cannot be obtained for a single object. For example, as mentioned above, by performing the conversion processing such as color expansion with the reference white point as the center, the color difference between a plurality of color reproduction objects is enlarged. To make a user generally recognize that an object is matched in color with a color reproduction object which is different in the color generating method from the above object, it may be necessary to expand and enlarge the color reproduction range of the color reproduction object as mentioned above. When an object has a non-luminous object color actually, the maximum luminance color to be reproduced depending on the intensity of illumination of the object is also changed. Therefore, by adjusting the setting of environment status of an object, even if the reproducing color is enlarged or reduced in the luminance direction, faithful color reproduction can be realized.

Embodiment 9

Figure 6:
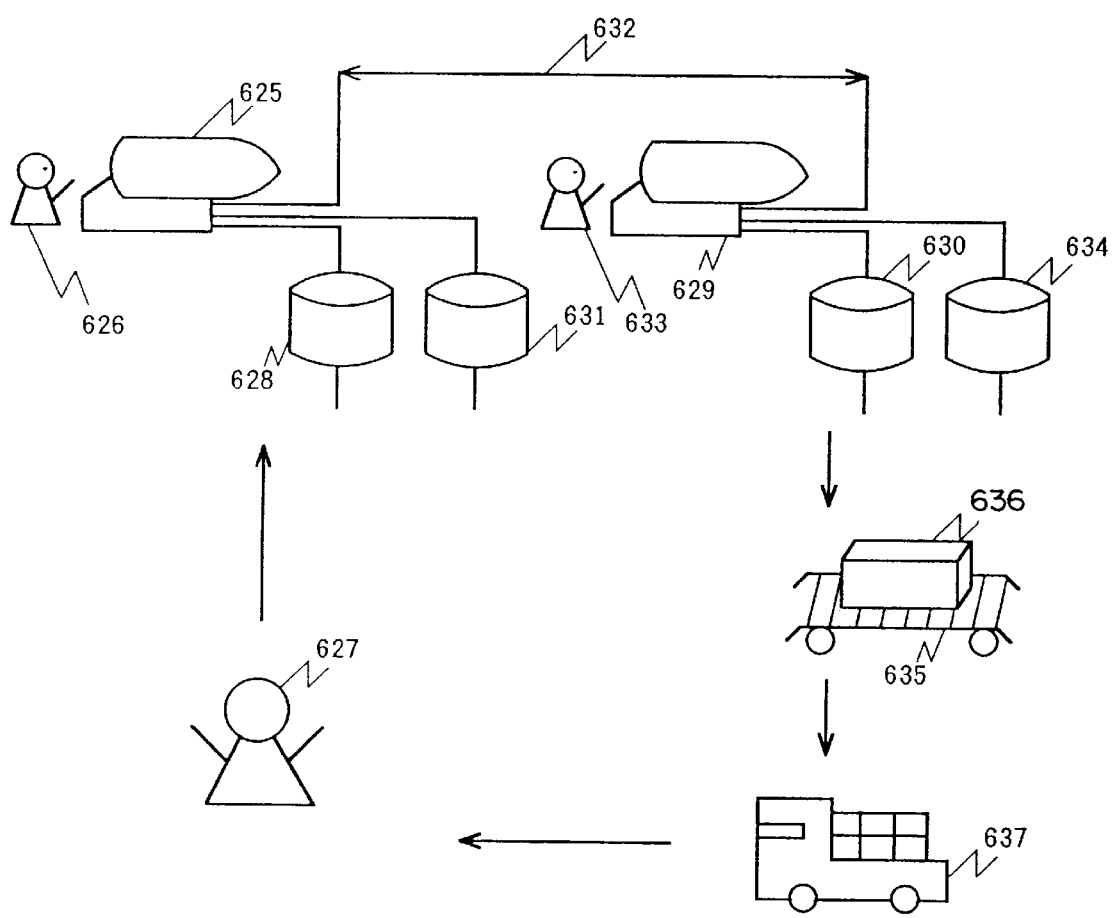
FIG. 6 is a block diagram showing an embodiment of application of the present invention to a system of quick production to order.
Figure 7A:
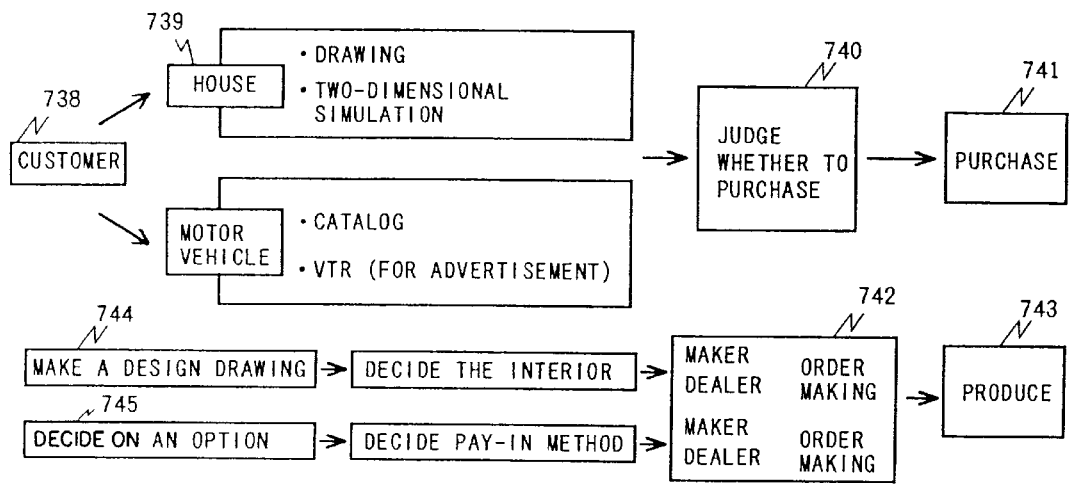
FIGS. 7(a) and 7(b) are comparison drawings of flow before and after application of the present invention to a system of quick production to order.
Figure 7B:
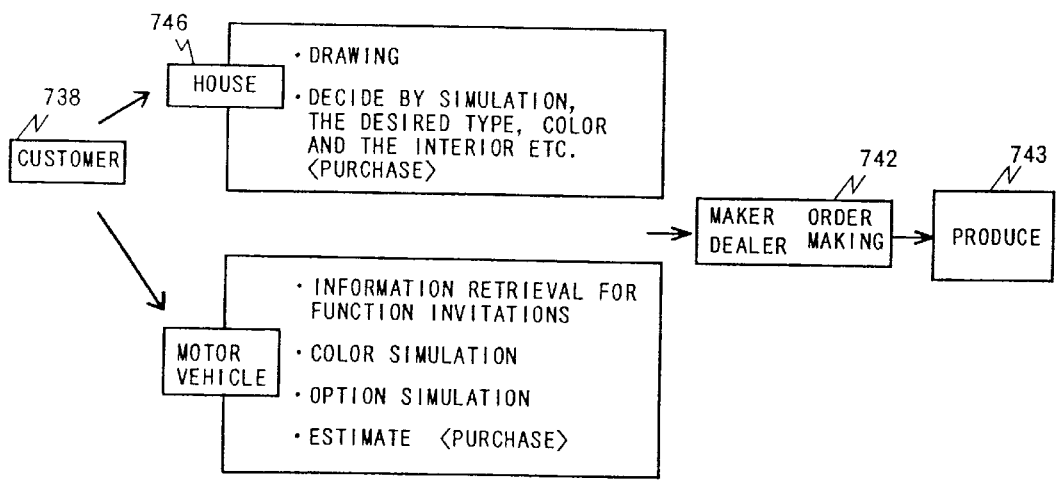

Next, an application example of the high fidelity color reproduction system to a retail to order system will be explained as another example of the present invention. FIG. 6 shows an application example of the present invention to a quick production to order system and FIGS. 7(a) and 7(b) show flow comparison drawings before and after application of the present invention to a quick production to order system. In FIG. 6, numeral 625 indicates a customer order reception terminal to which the present invention is applied. A terminal operator 626 enters input data relating to a product which is desired by a customer 627. A terminal 629 which is operated by an operator 633 is a factory terminal of a production management system at a factory which uses the present invention. Data bases (DB) 628 and 630 which are installed on the side of customer order reception terminal 625 and the side of factory terminal 629 respectively store, for example, color data on the basis of the Munsell color chips and are equivalent to the color data storage unit 105 shown in FIG. 1. Color data including data which guarantees faithful color reproduction between both data bases is stored in the color data of the data bases (DB) 628 and 630 and the color data is a standard for obtaining faithful color reproduction on the side of customer order reception terminal 625 and the side of factory terminal 629. DB 631 is a data base for storing order data from customers and querying it.

Numeral 632 indicates a communication route for transferring image data consisting of input data of customers and product data prepared at a factory and bidirectional or unidirectional data communication lines such as optical fiber or satellite communication lines can be applied to it. When customer order reception terminals and/or factory terminals are installed scattered at a plurality of locations, a bidirectional or unidirectional data network is applied to the communication route 632. Production management data which is created on the basis of order data which is received via the communication route 632 is stored in DB 634. On the basis of this production management data, by omitting feedback to the customer 627 or an order receiver by a prototype and only by using image feedback via the customer order reception terminal 625, products 636 manufactured on an actual production line 635 can be delivered to the customer 627 via a transport means 637 as they are. By using the above system, the customer 627 can purchase products as desired quickly.

Embodiment 10

Next, an example of the use method of the present invention will be introduced. The customer 627 inputs color data using an image as order data of the customer himself from the customer order reception terminal 625 installed in a store or showroom. This data is used to query DB 628 which is the standard for color data on the basis of the Munsell color chips and then displayed at the customer order reception terminal 625. The displayed color at this time is corrected beforehand so as to faithfully reproduce the color on the basis of the data stored in DB 628 and DB 630 under feedback control. When color data A displayed at the customer reception terminal 625 coincides with the desire of the customer 627 and an order is obtained, the color data A is stored in DB 631 as order data. This order information is transmitted to the factory together with the color data A. The displayed color at the factory terminal 629 is also corrected beforehand so as to faithfully reproduce the color on the basis of the data stored in DB 628 and DB 630 under feedback control. Therefore, by querying DB 630 which is the standard of color data with the color data A, the color data A which coincides with the desire of the customer 627 can be faithfully reproduced and displayed on the factory terminal 629. At the factory, commodities and members to be manufactured are calculated on the basis of this order information and obtained data B is stored in DB 634. Thereafter, this data B is sent to a production control computer at the factory and production starts.

The procedure flow of the retail to order system before the present invention is applied is shown in FIG. 7(a). For example, when a house is to be purchased, a construction drawing and two-dimensional simulation image (drawing) are shown to a customer 738 as house information 739. When the customer 738 is an amateur, he may make a judgment of whether to purchase 740 before he can understand the house information 739 fully. Thereafter, the house is ordered and it requires a lot of time until the purchase 741 (construction and supply) is finished. Namely, as operations on the order receiver side after the customer 738 judges to purchase, making a design drawing 744, deciding on an option 745, and ordering from makers and dealers by 742 remain before production 743. By applying the present invention to the retail to order system, the desire of the customer 738 can be reflected immediately in house information 746 which is used in the decision making stage of the customer 738 as shown in FIG. 7(b). By using a color data passing system as shown in this embodiment, the reliability of data is improved, and the customer can easily understand the data because it is an image, and the system can gain his confidence. The period from decision making of purchase to ordering can be shortened. According to the present invention, the period from examination of purchase by the customer via judgment of purchase to purchase by supply of the house can be shortened and a construction of quick production to order can be realized. By using an advantage of improvement in data reliability, a claim from a customer or a change in an order can be dealt with immediately. Therefore, as shown in FIG. 7(b), an order can be received immediately in the decision making stage of the customer. In FIGS. 7(a) and 7(b), an ordering example of an automobile is shown in addition to an example of house.

As mentioned above, the present invention is a system which is suited to nonstore retailing such as a quick production to order system or an order system for high-class consumption goods such as a house and automobile. In each embodiment mentioned above, a plurality of high fidelity color reproduction systems of the present invention are connected via the communication route 632 in FIG. 6. However, needless to say, by connecting an apparatus in which a single or a plurality of imaging apparatuses and a converter are combined to a controller or an image signal input terminal via the communication route 632, a quick production to order system can be constituted.

Embodiment 11

Figure 8:
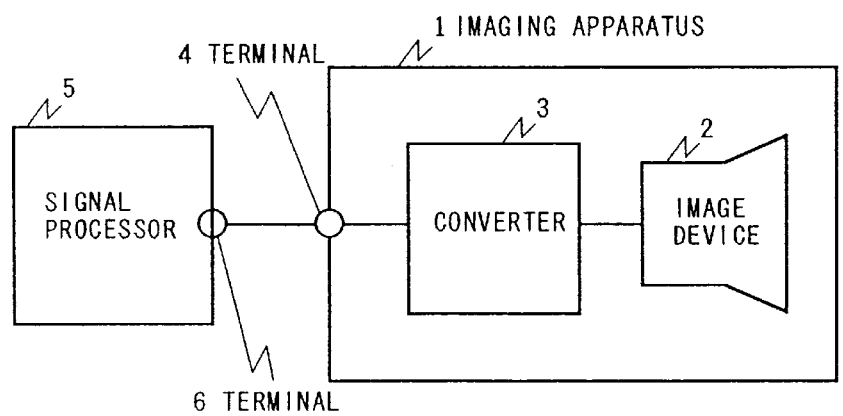
FIG. 8 is a block diagram showing a color correction system as a basic embodiment of the present invention.

Next, Embodiment 11 will be explained with reference to the accompanying drawings. FIG. 8 is a block diagram showing a color correction system as a basic embodiment of the present invention. In the drawing, numeral 1 indicates an imaging apparatus, 2 an image device, 3 a converter, 4 and 6 terminals, and 5 a signal processor.

In the color correction system shown in FIG. 8, the imaging apparatus 1 is connected to the signal processor 5 such as a personal computer or a workstation. The following various devices can be considered as an image device 2 installed in the imaging apparatus 1.

Namely, an output device such as a color CRT or printer, an input device such as a scanner, video camera, or keyboard, or an input and output device (a device which can input and output data) such as a copying machine, facsimile, or CD-ROM player can be used. Not only a color apparatus handling a plurality of image colors but also a monochromatic apparatus handling a single-color image having a plurality of gradations are equivalent to the imaging apparatus 1.

Therefore, the terminals 4 and 6 require both an input function and an output function respectively. The terminal 4 is connected to the image device 2 via the converter 3 and color changes caused by various reasons are corrected by the converter 3. Therefore, the color reproduction of an image signal which is inputted or outputted can be improved. The converter 3 has a conversion characteristic which can correct color changes caused by changes in the setting status or use environment of the imaging apparatus 1 (image device 2).

It is generally desirable to compensate for color changes caused by changes in the setting status or use environment of an imaging apparatus by the imaging apparatus itself at a high speed and with high precision. According to the aforementioned prior art, signals are all converted extensively by the signal processor such as a workstation so as to compensate for color changes caused by the imaging apparatus. Therefore, it is necessary to detect changes in the setting status or use environment of the imaging apparatus by the signal processor via a communication means for a certain period of time and regarding compensation for the detected change in the setting status or use environment, high-precision correction accompanied by feedback is difficult.

The conversion function of the converter 3 shown in FIG. 8 is divided into a linear processing function for linearly processing and outputting an input signal and a non-linear processing function for non-linearly processing and outputting an input signal. As linear processing, when the image device 2 is a display, processing for compensating for contrast or brightness adjustment of the display, color temperature setting of the displayed white, or others may be considered. When the image device 2 is a printer or scanner, needless to say, the linear processing function can be added as a processing function for compensating for gradation correction, lightness setting, color phase correction, and others.

Furthermore, there are some signal conversions necessary for sharing an image among different imaging apparatuses which can be achieved by the linear processing. For example, they are a signal conversion for compensation processing for three primary color signals of RGB when the imaging apparatus is a display or a signal conversion for compensation processing for primary color signals of CMY or CMYK when the imaging apparatus is a printer. As non-linear processing, compensation processing for gamma correction of the display or ambient light compensation processing when the imaging apparatus is a display or compensation processing such as density correction when the imaging apparatus is a printer or copying machine may be considered. The non-linear processing accompanying the non-linear compensation of each image device is often included in a signal conversion between the XYZ tristimulus values in the CIE colorimetric system and three primary color signals of RGB. Particularly among the lightness L decided by CIE and the aforementioned XYZ tristimulus values and primary color signals of RGB, the non-linear processing accompanying compensation for the non-linear characteristic of visual sensation of a human is necessary.

Among these processings, the control which can be set by a user as a function of the imaging apparatus 1 in FIG. 8 can be corrected by itself at high speed and with high precision by making the control for the conversion characteristic of the converter 3 correspond to the user setting. Even if the user adjusts the function of the imaging apparatus 1 via the control of the signal processor 5, when the imaging apparatus recognizes the control instruction, a self correction at high speed and with high precision is made possible in the same way as mentioned above.

Furthermore, also in the initial adjustment of the color correction system shown in FIG. 8 at the factory before shipment, by making the control for the conversion characteristic of the converter 3 correspond to the adjustment value, a self correction is made possible. For example, a color correction following the above contrast or brightness adjustment of the display by the user is made possible. Or, it may be also considered to suppress the resolution capacity of the display at low visual acuity so as to obtain a high luminance display in correspondence with a declaration input about the user's visual acuity.

Concretely, for example, the output resistance relating to the voltage gain setting of the video amplifier in the display is increased by making it variable or by switching it for the above declaration input about low visual acuity. By doing this, the gain of the video amplifier is increased, and a high luminance display is obtained, and the display resolution is reduced at the same time because the frequency band of the circuit becomes narrow. For the same declaration input about low visual acuity, the control voltage for the focus performance of the display element such as a CRT can be made variable.

By increasing the spot diameter of an electron beam scanning on the display screen under the focus control, the display luminance can be increased generally. Therefore, by enlarging the above spot diameter, although the resolution of the display element is decreased, the display luminance can be improved.

Furthermore, the use time (operation time) of the imaging apparatus by a user is self-recognized by an internal counter or other device and variations per year of the image device or others can be compensated for. For example, when the display uses a CRT, the contrast or brightness adjustment value for compensating for a reduction in the luminance due to a variation per year of the CRT can be corrected or the color temperature setting of the displayed white for compensating for variations between the primary colors due to the above variation per year can be corrected.

As an actual constitution of the converter 3 shown in FIG. 8, a look-up table consisting of an analog electronic circuit which can be electronically controlled by voltage or others and a memory, a D/A converter, and signal conversion implemented by software in which a rewritable conversion expression is described are provided. As a non-linear converter in the above analog electronic circuit, a circuit in which a logarithmic converter and an exponential converter using the non-linearity of a transistor are connected via a variable gain amplifier which can be controlled electronically or a circuit in which an operation point as a reflection point of a broken-line approximation circuit can be controlled electronically may be used.

As a linear converter, there are various circuit constitutions available using combinations of adder-subtracter circuits and variable gain amplifiers which can be controlled electronically. As a signal conversion method implemented by software, a set of characteristic parameters of the image device equivalent to the rewriting item of the conversion expression is prepared as a profile of the imaging apparatus and can be shared by various imaging apparatuses including different kinds of imaging apparatuses.

Figure 9:
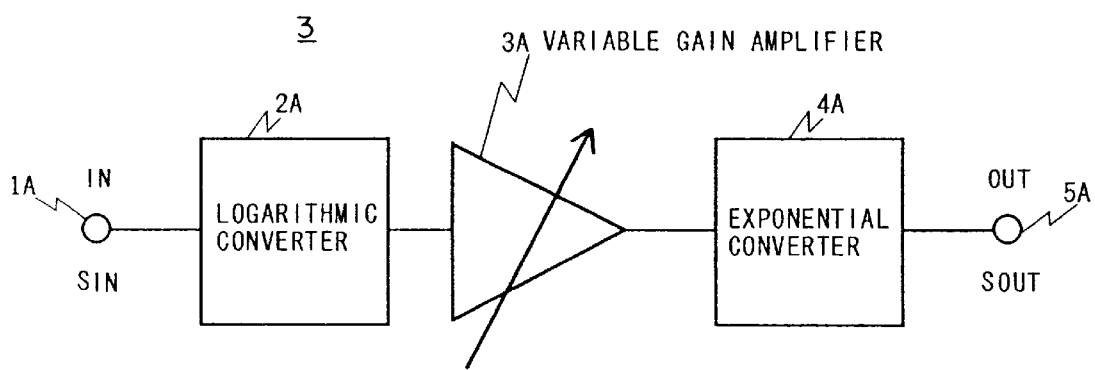
FIG. 9 is a circuit diagram showing a non-linear conversion circuit using an analog electronic circuit as an actual example of a converter.
Figure 10:
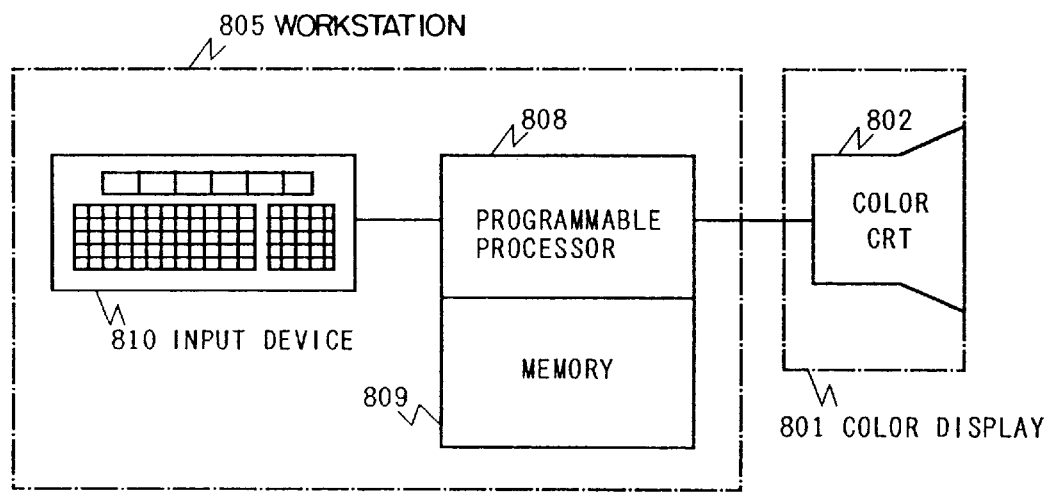
FIG. 10 is a block diagram showing the schematic constitution of a conventional computer graphic apparatus.

FIG. 9 is a circuit diagram showing a non-linear converter using an analog electronic circuit as one of actual examples of the converter 3. In the drawing, numeral 1A indicates an input terminal, 2A a logarithmic converter, 3A a variable gain amplifier, 4A an exponential converter, and 5A an output terminal. Such a non-linear converter can be used as the converter 3.

Figure 11:
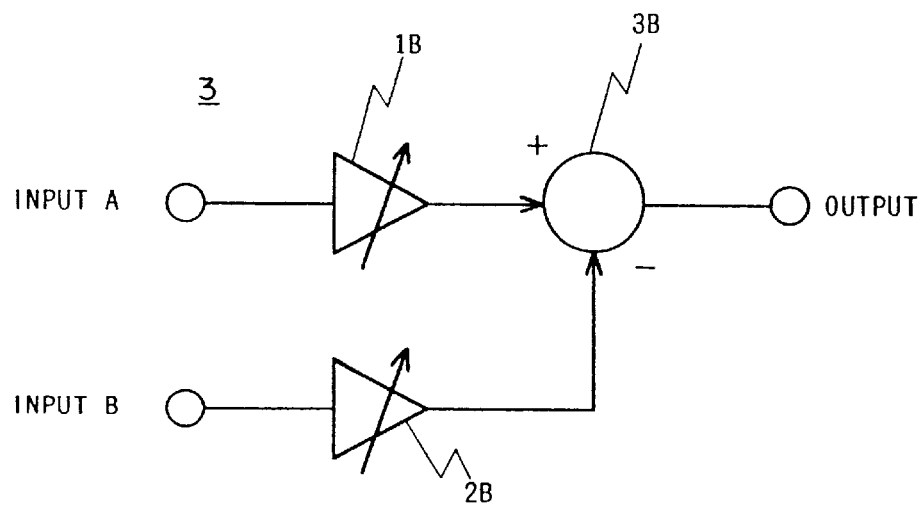
FIG. 11 is a circuit diagram showing a linear conversion circuit as another actual example of a converter.

FIG. 11 is a circuit diagram showing a linear converter as another actual example of the converter 3. Numerals 1B and 2B indicate variable gain amplifiers and 3B an adder-subtracter circuit. Such a linear converter can be used as the converter 3.

Figure 12:
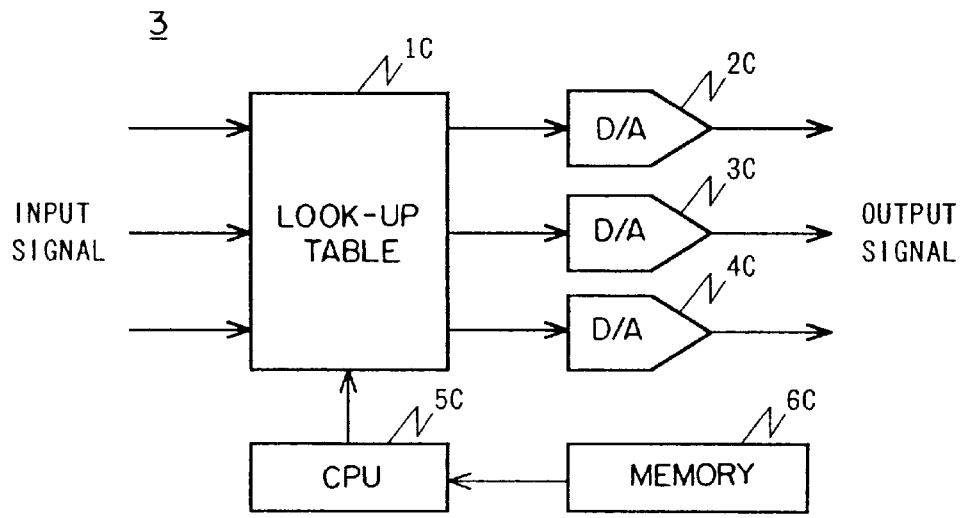
FIG. 12 is a circuit diagram showing a signal conversion circuit implemented by software as still another actual example of a converter.

FIG. 12 is a circuit diagram showing a signal converter implemented by software as still another actual example of the converter 3. In the drawing, numeral 1C indicates a look-up table (consisting of a memory and others), 2C to 4C D/A converters, 5C a CPU, and 6C a memory (storing a conversion expression which can be rewritten by software). A signal converter having such a constitution can be used as the converter 3. Next, an embodiment which makes it possible to compensate for variations in the setting status or use environment of the imaging apparatus which is not considered to be adjusted by a user is shown in the block diagram in FIG. 13. The setting item of the imaging apparatus which is not considered to be adjusted by the user is an adjustment which cannot be set by the user generally or which is automatically set as a function of the imaging apparatus. For example, it may be considered that the contrast or brightness adjustment of the display is automatically set according to external light or that the color temperature setting of the displayed white is automatically switched according to an input image signal to the display.

Figure 13:
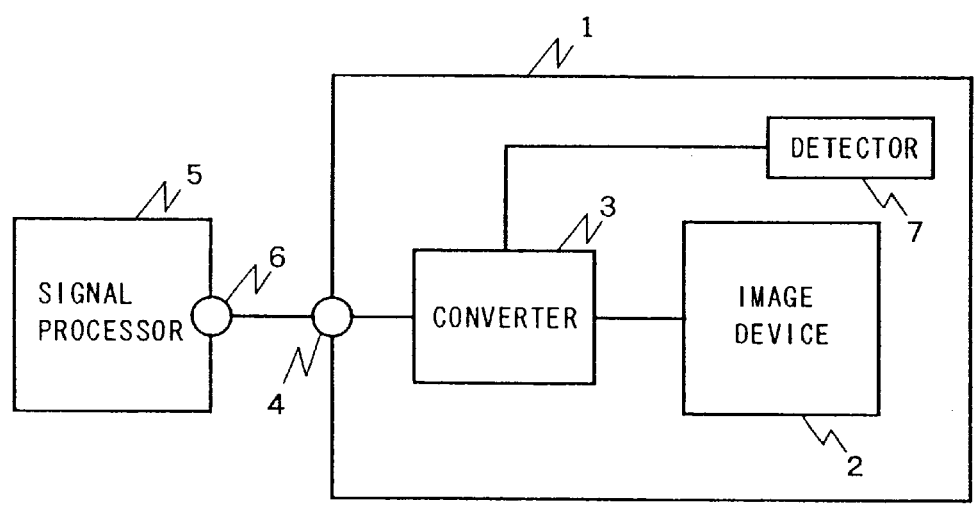
FIG. 13 a block diagram showing a color correction system as another embodiment of the present invention.

In the embodiment shown in FIG. 13, the setting status of the imaging apparatus 1, a variation in the use environment, and the use time of the imaging apparatus 1 are detected by a detector 7 connected to the converter 3. By controlling the conversion characteristic of the converter 3 on the basis of the detection result of the detector 7, a variation in the reproduced color for a variation in the setting status or use environment of the imaging apparatus 1 can be compensated for.

Objects to be detected by the detector 7 are the intensity and chromaticity of an illuminating light for an input and/or output image of the imaging apparatus 1, the beam current for exciting the external light or phosphor when the display has a CRT (the image device 2 is a CRT), and the kind of printing paper and others when the display is a printer. For example, when the display is a printer, by detecting the color of printing paper by the detector 7, a variation in the reproduced color of printing paper under the standard light source can be compensated for.

Furthermore, when the color of illuminating light in the use environment of printing paper is detected by the detector 7 or when it is recognized by the converter 3 beforehand by setting by user input, a variation in the reproduced color according to the use environment of each user can be compensated for. Even when the image device 2 is an image input device, by recognizing the wavelength characteristic of illuminating light when an image is acquired, the reproduced color of the output image can be corrected. By detecting the temperature and humidity around and inside the printer using the detector 7, a variation in the color generating characteristic of printing ink can be compensated for. Therefore, the detector 7 may be installed inside or outside the imaging apparatus.

Figure 14:
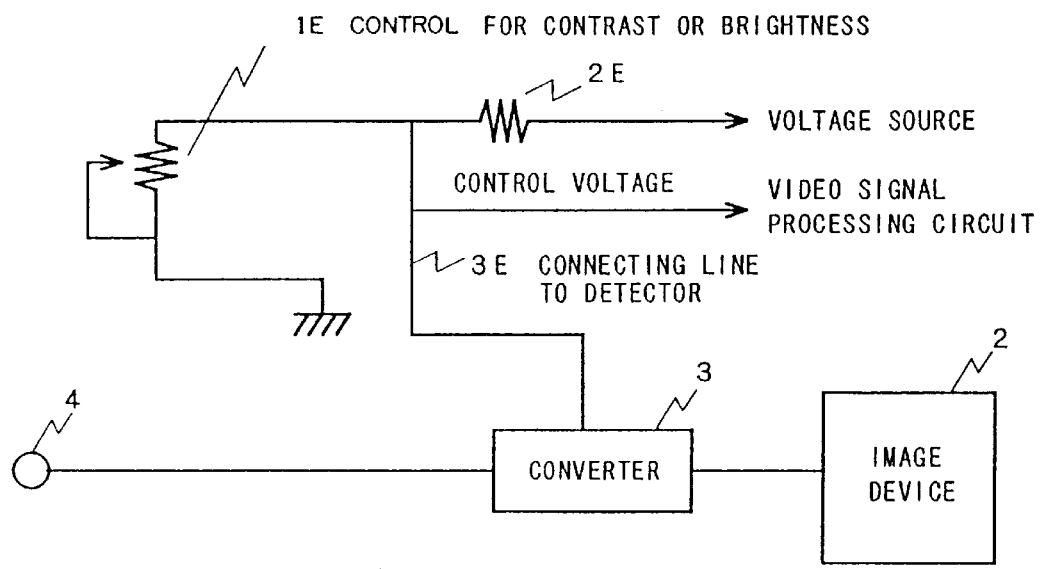
FIG. 14 is a circuit diagram showing an actual example of the detector 7 shown in FIG. 13.
Figure 15:
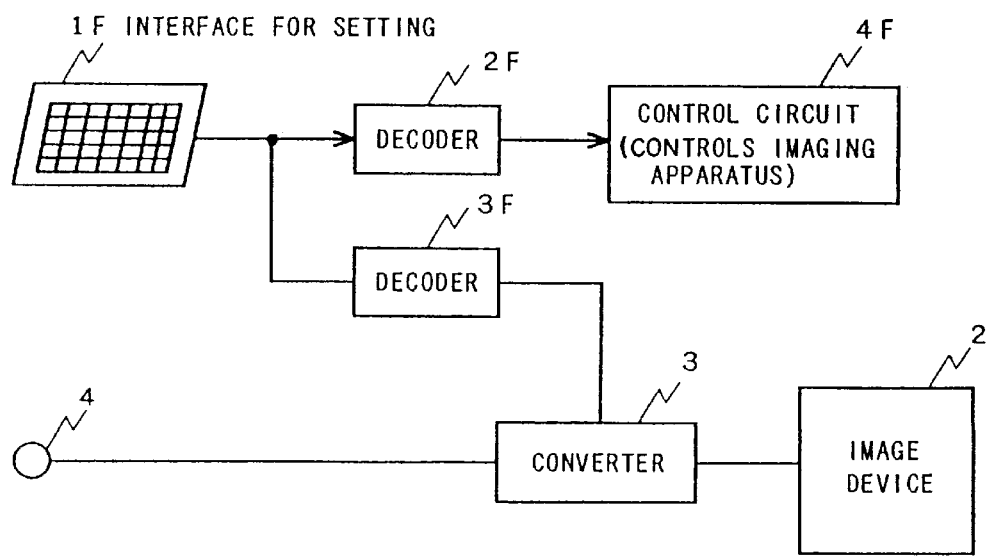
FIG. 15 is a block diagram showing the constitution of a detector for fetching setting control data as another actual example of the detector 7 shown in FIG. 13.

FIG. 14 is a circuit diagram showing an actual example of the detector 7 shown in FIG. 13. In the drawing, numeral 1E indicates a control for contrast and brightness, 2E a resistor, and 3E a connecting line to the detector. By fetching a control voltage via the connecting line to the detector 3E, the detector 7 fulfills the detection function. FIG. 15 is a block diagram showing the constitution of a detector for fetching control data for setting as another actual example of the detector 7 shown in FIG. 13. In the drawing, numeral 1F indicates an interface for setting (keyboard, operating switch, etc.), 2F a decoder (which converts a signal code from the interface for setting 1F to a control signal), 3F a decoder (which converts a signal code from the interface for setting 1F to a signal for the converter 3), and 4F a control circuit (which controls the imaging apparatus).

Figure 16:
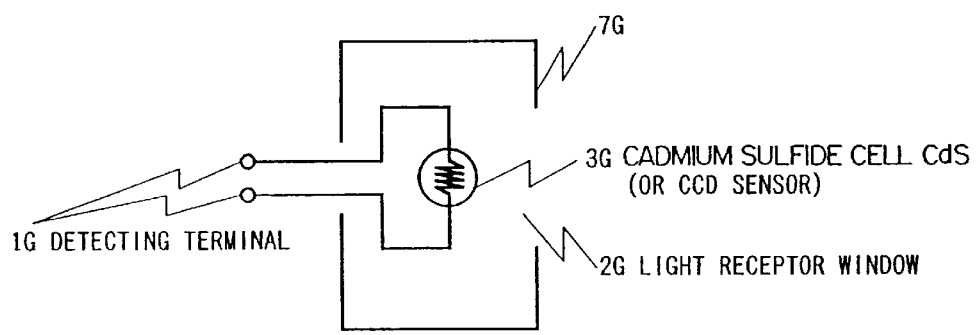
FIG. 16 is an illustration showing an example of an external light detector as an actual example of a detector for detecting a change in the use environment of an imaging apparatus.

FIG. 16 is an illustration showing an example of an external light detector 7G as an actual example of a detector for detecting variations in the use environment of the imaging apparatus. In the drawing, numeral IG indicates detecting terminals, 2G a light receptor window, and 3G a cadmium sulfide cell CdS (or a CCD sensor). The resistance between the detecting terminals 1G varies according to the intensity of external light incoming from the light receptor window 2G. In this example, different filters are mounted on a plurality of cadmium sulfide cells CdS respectively and each CdS detection output is used, so that the color of external light can be detected.

Figure 17:
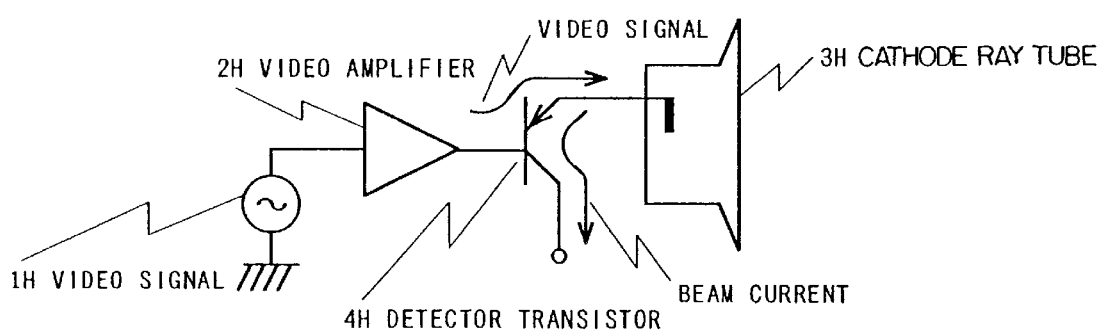
FIG. 17 is an illustration showing an example of a cathode-ray tube beam current detector of a cathode-ray tube display as an actual example of a detector for detecting a change in the use environment of an imaging apparatus.

FIG. 17 is an illustration showing an example of a cathode ray tube beam current detector of a cathode ray tube display as an actual example of a detector for detecting variations in the use environment of the imaging apparatus. In the drawing, numeral 1H indicates a video signal, 2H a video amplifier, 3H a cathode ray tube, and 4H a detector transistor. The beam current can be detected from the collector terminal of the detector transistor 4H.

Figure 18:
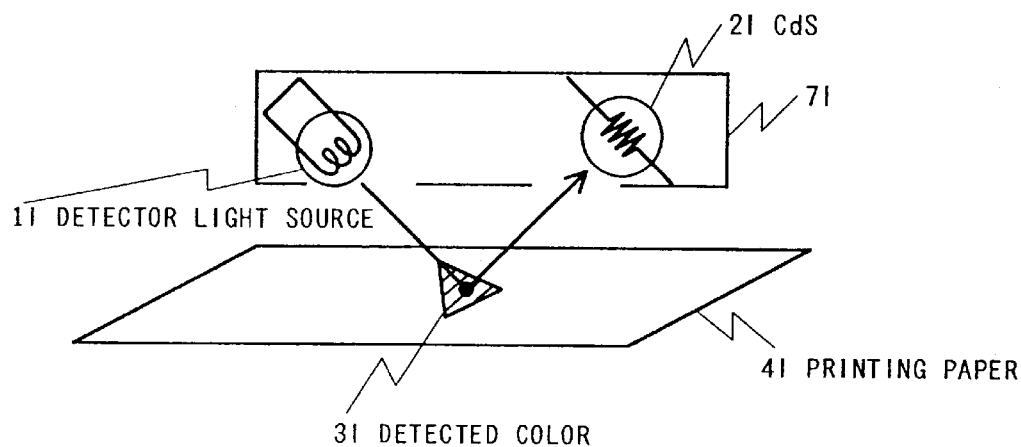
FIG. 18 is an illustration showing an example of a print color detector as an actual example of a detector for detecting a change in the use environment of an imaging apparatus.

FIG. 18 is an illustration showing an example of a print color detector 7I as an actual example of a detector for detecting variations in the use environment of the imaging apparatus. In the drawing, numeral 1I indicates a detector light source (correctable by a detected signal instead of the standard light source), 2I a cadmium sulfide cell CdS, 3I a detected color, and 4I a printing paper. When the reflected light of the light from the detector light source 1I from the printing paper 4I is detected by the CdS 2I with a filter, the print color 3I can be detected.

Figure 19:
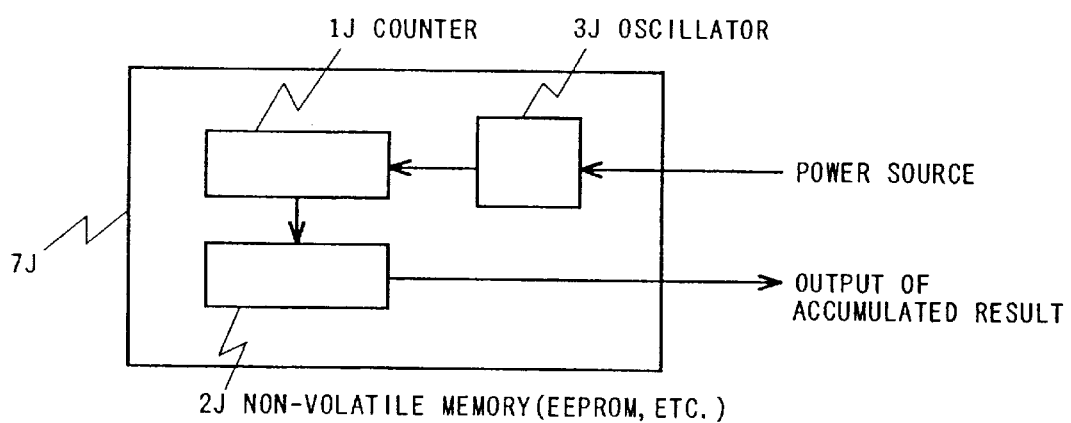
FIG. 19 is an illustration showing an actual example of a detector for detecting the use time length of an imaging apparatus.

FIG. 19 is an illustration showing an example of a detector 7J for detecting the use time length of the imaging apparatus. In the drawing, numeral 1J indicates a counter, 2J a non-volatile memory (EEPROM, etc.), and 3J an oscillator. When the oscillator 3J is driven when the imaging apparatus is turned on, and the count result of oscillation output by the counter 1J is stored in the non-volatile memory 2J, and the memory stored data is outputted as an accumulated result, the use time length of the imaging apparatus can be detected.

On the other hand, the converter function can be realized also by an interface between the imaging apparatus and a signal processor such as a personal computer or workstation. Therefore, an embodiment of the present invention using such an interface as a converter function will be explained hereunder with reference to the external view of the imaging apparatus shown in FIG. 20.

Figure 20:
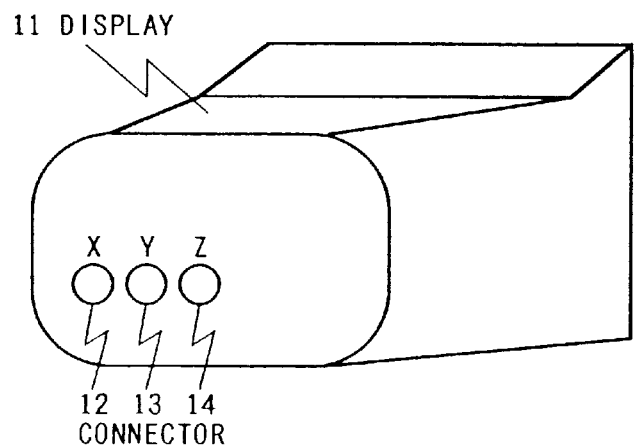
FIG. 20 is a schematic view of an imaging apparatus for explaining another embodiment of the present invention.

FIG. 20 is a rear view of a display 11 which is an imaging apparatus, and which has BNC connectors 12 to 14 as an example of video signal input terminals. As an image signal to be inputted into the video signal input terminals 12 to 14, a signal which is proportional to or corresponding in a linear conversion basis to the XYZ tristimulus values decided by CIE in consideration of the visual characteristic of a human is used.

Next, the XYZ tristimulus values will be explained briefly. The Y tristimulus value is equivalent to the lightness of color (luminance) and is decided from the measured result of lightness in consideration of the visual characteristic of a human. The XYZ tristimulus values are positive values and when all the values are equal, the color becomes white.

When the primary colors CMY or CMYK (C means cyan, M means magenta, Y means yellow, and K means black) are used as an image signal, by connecting it directly to the interface cable for a printer, the display 11 can be used as a monitor before printing.

Therefore, the same as with the circuit constitution of the embodiment shown in FIG. 8, in FIG. 20, it is necessary to convert the image signal to a primary color signal via the converter installed in the display 11 and then add the converted image signal to the display device. By using XYZ signals as an image signal which is inputted or outputted to each imaging apparatus, the partial change of the characteristic compensation function of each imaging apparatus on the signal processor side can be lightened or omitted.

Namely, it is not necessary that the signal processor side recognizes not only compensation of the effect of variations in the setting status and use environment of each imaging apparatus but also gradation correction and white balance adjustment and necessary adjustment and setting of variations in the image device at the factory before shipment and at periodic calibration and faithful color reproduction can be obtained on images handled by each imaging apparatus.

XYZ signals of an imaging apparatus handling non-luminous object color images such as a printer are signals equivalent to the reflectance of illuminating light which are the XYZ tristimulus values. However, the XYZ tristimulus values of the light source color of an imaging apparatus such as a display are luminance or light emission energy. However, when the above XYZ signals equivalent to the reflectance are used as a common signal between the imaging apparatuses, the absolute luminance of the light source color can be adjusted by setting of the imaging apparatuses.

When the above XYZ signals equivalent to the light source color are used as a common signal between the imaging apparatuses, by defining the wavelength component value of the luminance or light intensity equivalent to the tristimulus value according to the signal level, the intensity of an illuminating light of a non-luminous object color can be set. Furthermore, even when one of the above two kinds of signals is used as XYZ signals, equivalent color reproduction (definition of Hunt) which uses the character of a human for recognizing colors by relative color comparison can be obtained without the aforementioned setting and adjustment of the imaging apparatuses and setting of the intensity of an illuminating light of a non-luminous object color.

As an image signal which is inputted or outputted into or from each imaging apparatus, the Yxy and Yuv values which can be converted from the above XYZ tristimulus values may be converted to signals and used. By using these signals converted from the XYZ tristimulus values, the fixed quantity of addition and subtraction results of colors can be easily grasped. Furthermore, to reduce the processing time of the signal processor, color parameters equivalent to the coordinates in the color space in a color system such as CIELUV or CIELAB in which color definition in a uniform color space is possible can be converted to signals and used.

By adding information data relating to the kind of I/O images handled by each imaging apparatus in addition to the above image signals, the processing time of the signal processor can be reduced further and the signal conversion processing in each imaging apparatus can be speeded up. As additional data, information on whether an image is a moving picture or a still picture or information on pixel arrangement such as the aspect ratio and number of pixels can be considered. For example, when the color reproduction precision is lower than the vision recognition precision such that an image which requires consideration of color reproduction is a moving picture or an image in a very small area, the signal conversion precision by each imaging apparatus or the signal processor is suppressed and the processing can be speeded up.

To ensure faithful color reproduction, addition of information data relating to the I/O images and the use environment of each imaging apparatus can be considered in addition to the above image signals. By designation of I/O images and the use environment of each imaging apparatus, the effect of the above image illuminating light and the ambient light of each imaging apparatus can be compensated for.

Furthermore, by adding information relating to an imaging apparatus handling the object image, the color reproduction can be improved even more. For example, when an imaging apparatus which i most suited to the object image among the imaging apparatuses of the same kind connected to the signal processor is designated, the best color reproduction can be ensured. By adding information relating to an imaging apparatus handling the object image, image data can be passed between the imaging apparatuses without passing through a signal processor as will be described later.

Figure 21:
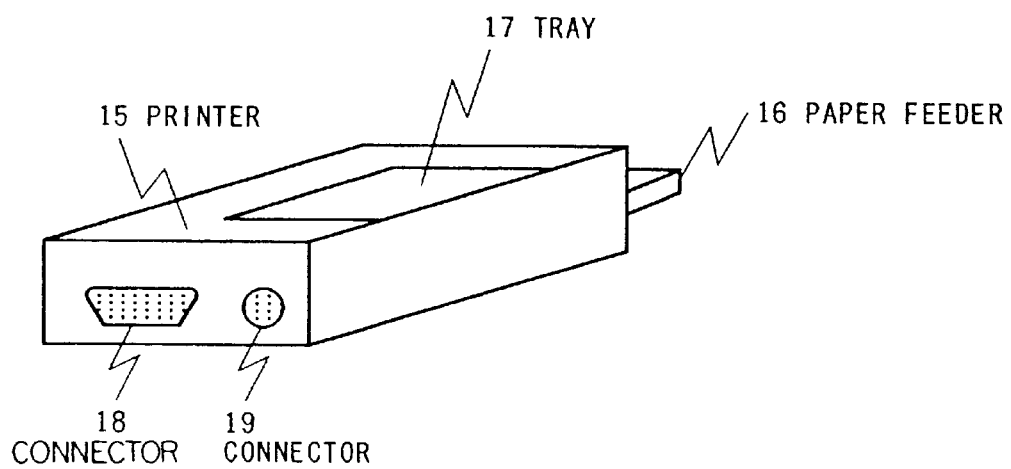
FIG. 21 is a schematic view of an imaging apparatus for explaining still another embodiment of the present invention.

Next, an embodiment of the present invention in the interface constitution between an imaging apparatus and the signal processor will be explained with reference to the external view of the imaging apparatus shown in FIG. 21. The rear view of a printer 15 as an imaging apparatus is shown in FIG. 21. The printer 15 has a paper feeder 16 and a tray 17 for printed output paper and interface connectors 18 and 19 are installed at the lower part of the back of the printer.

The connector 18 is called a D connector and can connect a plurality of signals at a time unlike the above BNC connectors shown in FIG. 20 and other single signal connectors. The connector 19 is called a talk connector and can connect a plurality of signals at a time in the same way as the connector 18, though it is a standard connector with a shape which is the same as that of an S video terminal which is becoming popular in various signal processors and imaging apparatuses.

However, needless to say, by multiplexing signals on one signal line among a small number of signal connectors, the number of signal lines can be reduced. For example, when a composite video signal, a Y signal and a C signal, a Y signal and a color difference signal, or others are used as image signals and the converter is provided with a signal separation function, the number of signal lines can be reduced. Both the serial and parallel methods can be used as a signal transmission configuration and both unidirectional data transmission and bidirectional data transmission can be considered on the signal line.

Therefore, also GP-IB and RS232C can be applied. Also as a signal configuration, the light intensity and wavelength which are superior in high speed and noise resistance can be considered in addition to digital and analog values of voltage and current.

Next, an embodiment in which the color reproduction is furthermore improved by adding the information relating to an imaging apparatus handling the object image as mentioned above will be described in detail. The block diagram shown in FIG. 22 shows an embodiment wherein an image signal is shared between each signal processor and each imaging apparatus as a standard signal.

Figure 22:
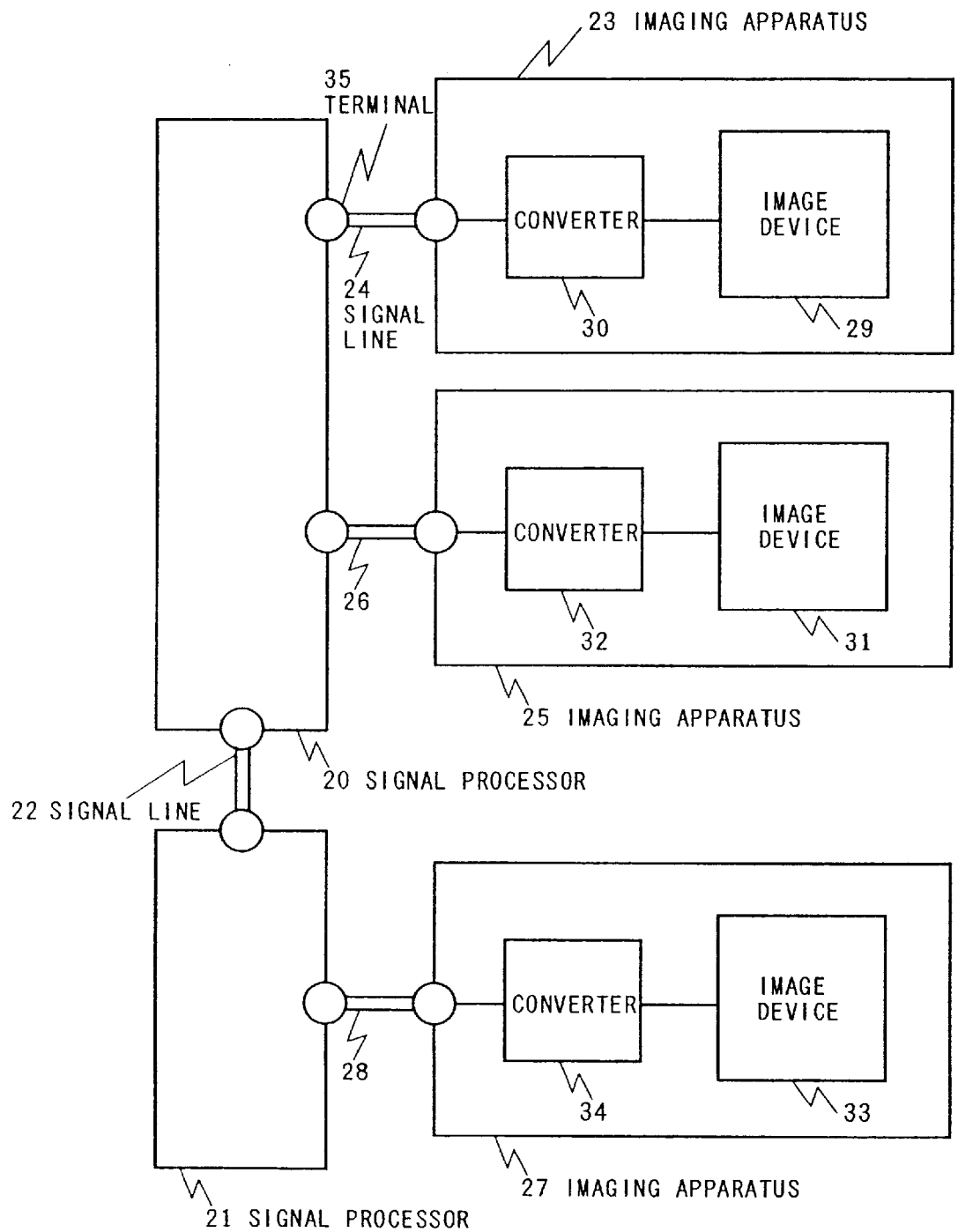
FIG. 22 is a block diagram showing an embodiment wherein an image signal is shared as a standard signal between each signal processor and each imaging apparatus.

In FIG. 22, signal processors 20 and 21 are connected to each other via a signal line 22. One of a unidirectional line and bidirectional line may be applied to the signal line 22. The signal processor 20 is further connected to imaging apparatuses 23 and 25 respectively via signal lines 24 and 26. Also the signal processor 21 is further connected to an imaging apparatus 27 via a signal line 28. At least one signal can be transmitted via the signal lines 24, 26, and 28 in consideration of the aforementioned number of signal kinds. Furthermore, the signal lines 24 and 26 may have a branch constitution halfway by sharing a terminal 35.

An example of the use method for the system shown in FIG. 22 is that a converter 30 adds the information that the image output of the image device 31 in the imaging apparatus 25 is suitable to the image data fetched from an image device 29 in the imaging apparatus 23. The above addition information recognizing the function of each imaging apparatus can be a part of the function of the converter 30 by transmitting the image data to the image device 31 in the imaging apparatus 25 at the latter stage only when the above addition information for designating the operation of the imaging apparatus is recognized.

As an internal constitution of the converter 30 at that time, it can be considered to add and prepare an addition data recognition unit consisting of a decoder circuit and others to the aforementioned component for recognizing the addition data. As to connection thereof, it can be considered to input an input signal to the above component via the addition data recognition unit or to distribute and add an input signal to the addition data recognition unit and the above component in parallel. In either case, the system is constituted so as to control the converter by output of the addition data recognition unit.

In FIG. 22, image data is transmitted to the imaging apparatus 25 by recognizing the above addition information by the signal processor 20 or the imaging apparatus 25 and image output which is desired by a user is obtained. When the information that the image output of the image device 33 in the imaging apparatus 27 is suitable is added by the converter 30 in the imaging apparatus 23, the image data is transmitted to the imaging apparatus 27 via the signal processors 20 and 21.

Furthermore, in the above embodiment, even if the imaging apparatuses 25 and 27 do not have converters 32 and 34 respectively as shown in the drawing or even if the imaging apparatuses 25 and 27 do not have the above addition information recognizing function, an image output which is desired by a user can be obtained by transmitting the image data to the appropriate imaging apparatus in the same way as described above using an addition information recognizing function provided in the signal processor 20 or 21.

Figure 23:
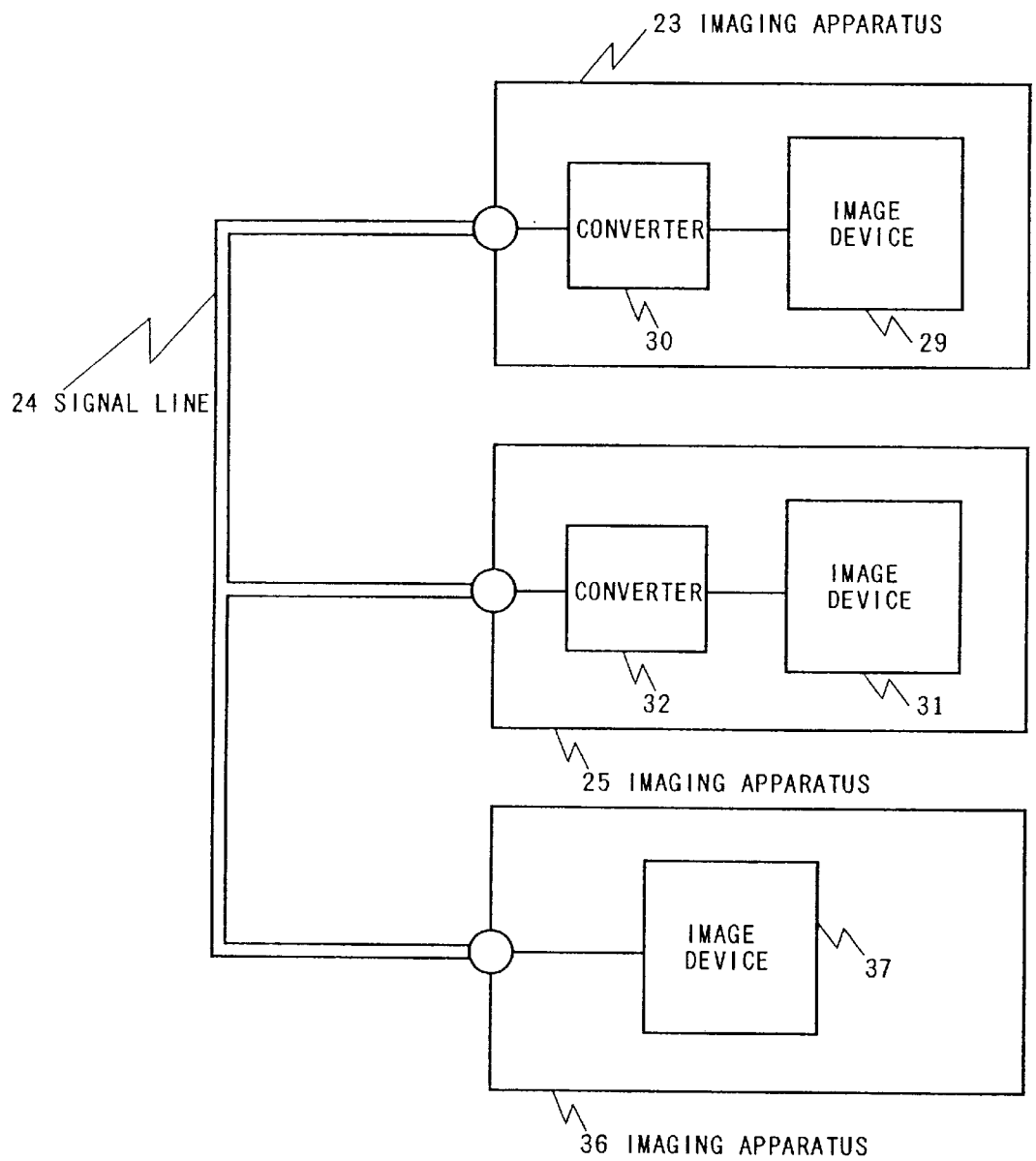
FIG. 23 is a block diagram showing an embodiment wherein image data can be passed between imaging apparatuses without passing through a signal processor.

An embodiment when image data can be passed between each imaging apparatus without passing through a signal processor as mentioned above will be explained with reference to the block diagram shown in FIG. 23. In FIG. 23, imaging apparatuses 23, 25, and 36 are connected to each other via a signal line 24 and the imaging apparatuses 23 and 25 are provided with converters 30 and 32 respectively.

In the embodiment shown in FIG. 23, it is necessary that at least two kinds of the imaging apparatuses which are connected to each other have converters for recognizing the above addition information. For example, when the information that the image output of the image device 31 in the imaging apparatus 25 is suitable is added by the converter 30 in the imaging apparatus 23 to the image data outputted to the signal line 24, the imaging apparatus 25 directly recognizes the above addition information and image output is obtained.

In this case, since the imaging apparatus 36 which is also connected to the signal line 24 does not have a converter for recognizing the above addition information, the transfer format does not coincide with that of the other imaging apparatuses and an image device 37 in the imaging apparatus 36 cannot handle image data. Characteristics of this embodiment are speeding up of the image processing because no signal processor is used and miniaturization of the system and flexibility of the constitution because only imaging apparatuses are connected.

Figure 24:
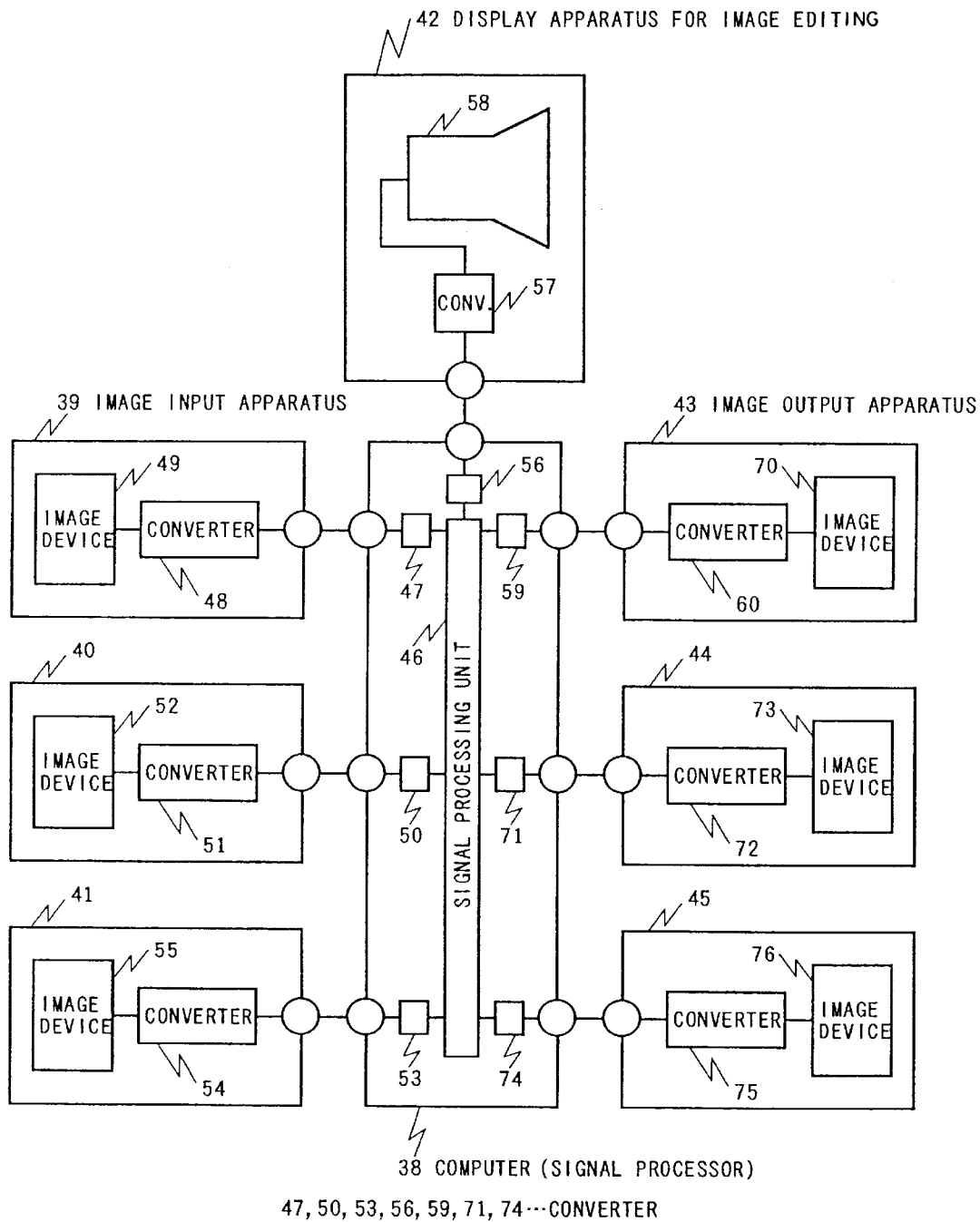
FIG. 24 is a block diagram showing an embodiment wherein the present invention is applied to a computer system having various kinds of imaging apparatuses.

Next, an embodiment wherein the present invention is applied to a computer system having various imaging apparatuses is shown in the block diagram in FIG. 24. In FIG. 24, image input apparatuses 39 to 41, a display apparatus for image editing 42, and image output apparatuses 43 to 45 are connected to a computer 38 which is hereinafter referred to as a signal processor.

As the above image input apparatuses 39 to 41, the following apparatuses are considered. Namely, they are consumer and business apparatuses such as an electronic camera, photo CD player, driver for photo-electromagnetic disk MD or floppy disk FD, video camera, video signal interface apparatus, scanner, keyboard, etc.

As the above display apparatus for image editing 42, display apparatuses having a CRT, liquid crystal display panel, plasma display unit, or stereo display unit are considered. As the above image output apparatuses 43 to 45, the following apparatuses are considered. Namely, they are consumer and business apparatuses such as a printer, color copier, image setter, type color copier which is an image I/O apparatus which can be used together with the above image input apparatus, photo CD player, MD or FD driver, and video signal interface apparatus. A signal processing unit 46 is included in the signal processor 38.

Signal conversion of each imaging apparatus shown in FIG. 24 is allotted to the converters which are installed in the imaging apparatuses and the signal processor respectively. For example, the non-linear processing such as gradation correction which is intrinsic to each imaging apparatus and the effect of setting conditions, variations per year, or use environment are compensated for by converters 48, 51, 54, 60, 72, and 75 in the imaging apparatuses.

It is desirable that conversion processing which does not require a large-scale circuit and a large software program such as the linear conversion which is included in the signal conversion (for example, conversion between RGB signals and CMYK signals) which is necessary for color balance adjustment of an image or for sharing an image between different imaging apparatuses is executed by converters 47, 50, 53, 56, 59, 71, and 74 in the signal processor.

By allotting the signal conversion like this, the circuit scale and software program amount of the converters in the signal processor are reduced, and the cost of the system is decreased, and the signal conversion processing including the imaging apparatuses are speeded up and the precision thereof is increased. By constituting the converters in the imaging apparatuses using developed dedicated ICs and general purpose ICs, the signal conversion processing can be speeded up and the precision thereof is increased furthermore.

The time required for image processing of a large amount of data is generally long and the correction time for look-up tables in the converters in the signal processor also becomes long. Since the signal processor may control a plurality of imaging apparatuses at the same time, there is a great demand for speeding up the signal processing.

Figure 25:
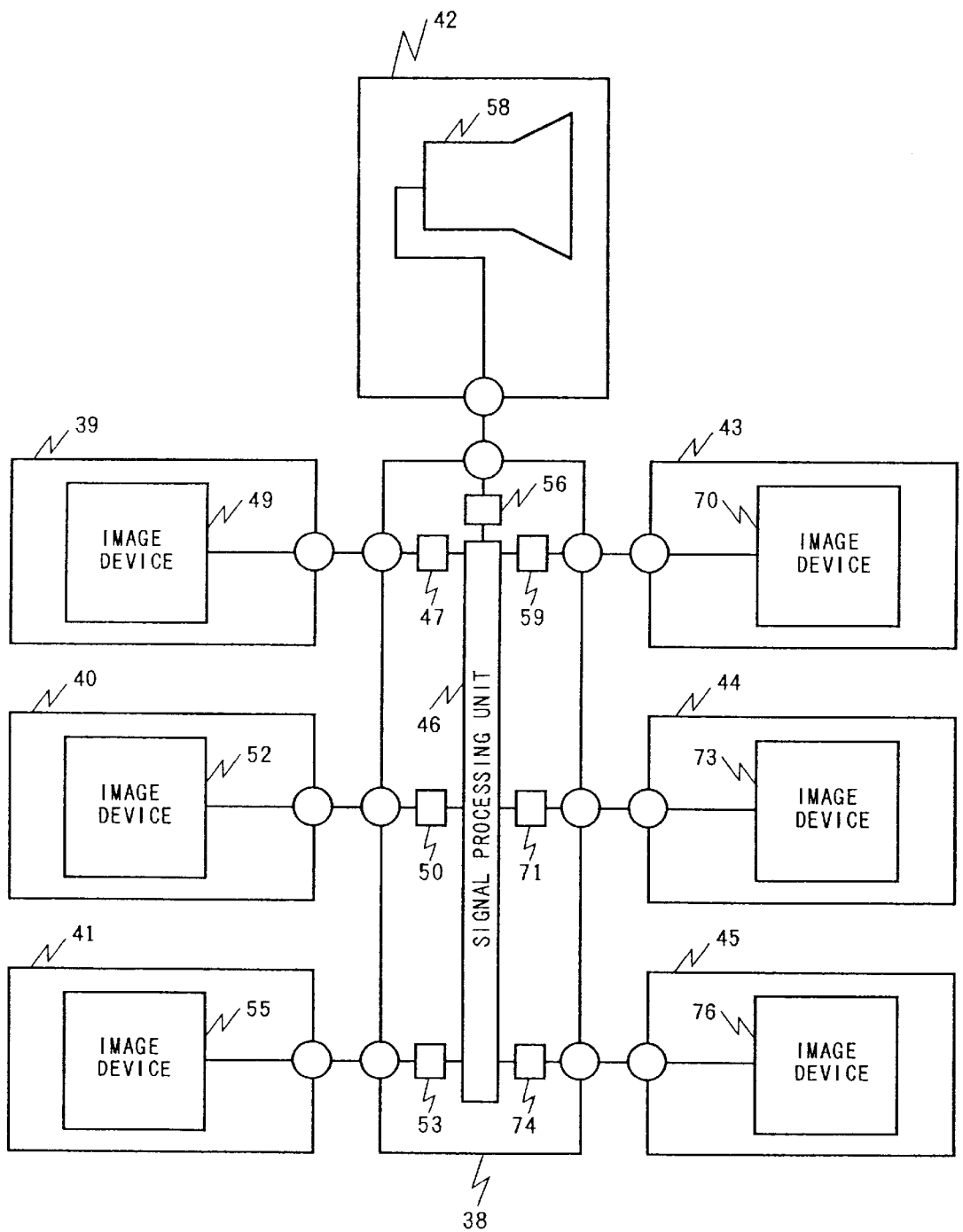
FIG. 25 is a block diagram showing the outline of a color matching system.

Next, an embodiment wherein the present invention is applied to a color matching system which can reproduce the same color independently of an imaging apparatus will be explained. First, the outline of the color matching system is shown in the block diagram in FIG. 25. In FIG. 25, the image input apparatuses 39 to 41, the display apparatus for image editing 42, and the image output apparatuses 43 to 45 are connected to the signal processor 38 in the same way as in FIG. 24. To improve the color reproduction between images which are handled by each of the above imaging apparatuses, image signals are passed between each imaging apparatus via the converters 47, 50, 53, 56, 59, 71, and 74. The above converters consist of a look-up table and others and the conversion characteristic of the converters can be corrected by the software according to each imaging apparatus. A set of data of characteristic parameters of each imaging apparatus is prepared as a profile of the imaging apparatus. However, as mentioned above, the color reproduction of each imaging apparatus is changed by the effect of variations in the setting status or use environment or variations per year, so that the fidelity of color reproduction between a plurality of imaging apparatuses in the above color matching system is low. An embodiment of the present invention wherein faithful color reproduction which does not depend on imaging apparatuses can be ensured in the color matching system will be explained with reference to the block diagram shown in FIG. 26.

Figure 26:
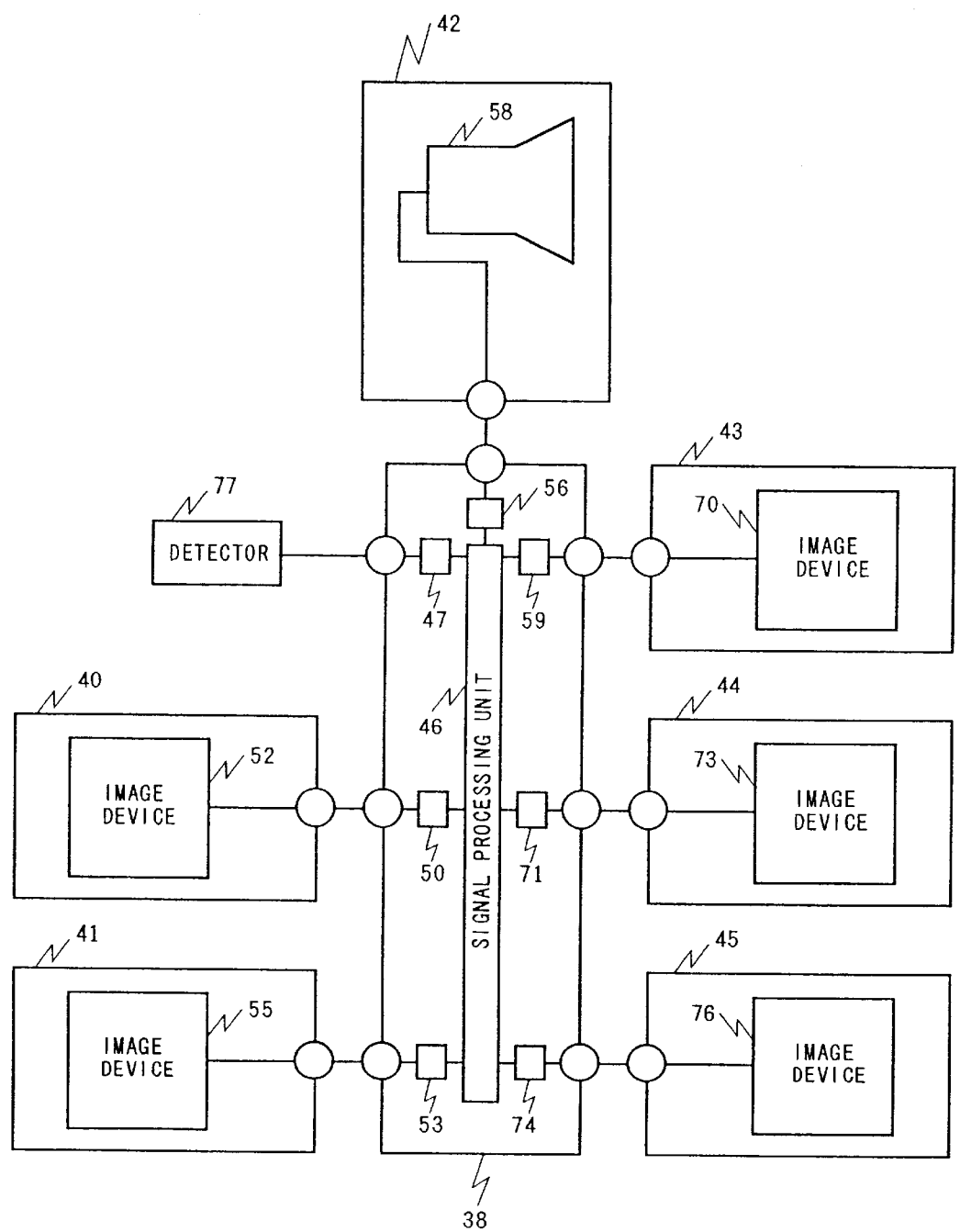
FIG. 26 is a block diagram showing an embodiment of the present invention which can ensure faithful color reproduction independently of an imaging apparatus in a color matching system.

A difference from the color matching system shown in FIG. 25 is that the color reproduction of each imaging apparatus is detected using a detector 77 in FIG. 26 and the profile data for deciding the conversion characteristic of the converter thereof can be corrected. A photosensor or video camera for detecting image colors handled by each imaging apparatus can be used as the detector 77 shown in FIG. 26. Particularly when a single detector 77 is shared for detecting image colors of each imaging apparatus, high fidelity color reproduction can be obtained.

The detection result of image colors handled by each imaging apparatus is sent to the signal processing unit 46 from the detector 77 via the converter 47. The converter 47 is installed so as to correct for the detection characteristic of the detector 77, though it may be eliminated. By correcting the profile data for deciding the characteristic of the converter of each imaging apparatus using the software on the basis of the above detection result of the detector 77, faithful color reproduction can be maintained. In the same way as with the detector 7 shown in FIG. 13, the detector 77 may be used to detect the setting status, a variation in the use environment, and the use time of each imaging apparatus.

Next, another embodiment of the present invention wherein faithful color reproduction which does not depend on imaging apparatuses can be ensured in a color matching system will be explained with reference to the block diagram shown in FIG. 27. In the embodiment shown in FIG. 27, an imaging apparatus 1 having a constitution which is the same as that shown in FIG. 13 is used and the imaging apparatus 1 can correct the profile data for deciding the characteristic of a converter 3 contained in itself.

Figure 27:
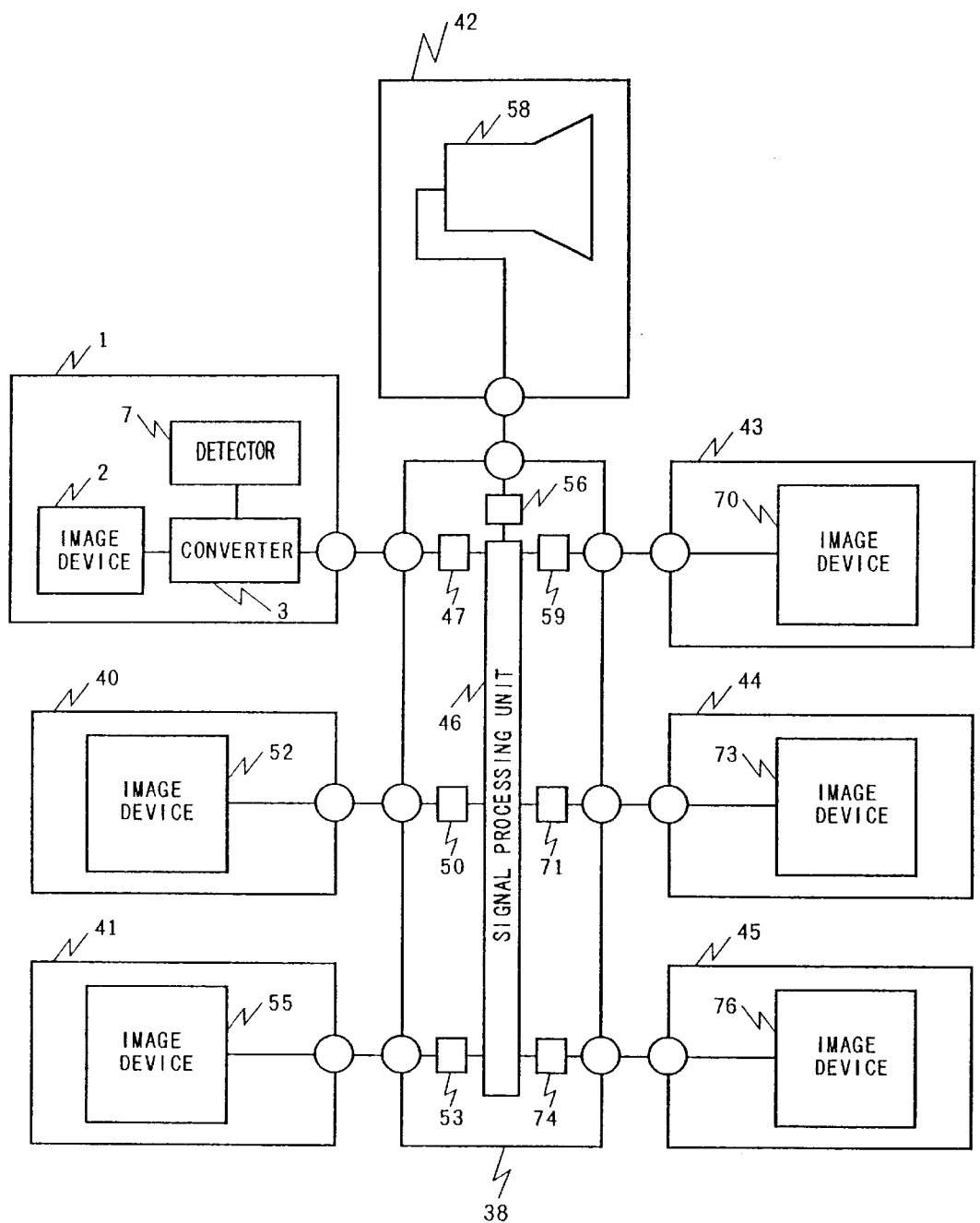
FIG. 27 is a block diagram showing an embodiment in which an imaging apparatus 1 having a constitution which is the same as that shown in FIG. 13 can correct profile data for deciding the characteristic of a converter 3 which is provided in itself.

The detector 77 shown in FIG. 26 may be used as the detector 77 shown in FIG. 27. When this embodiment shown in FIG. 27 is used, in the same way as with the embodiment shown in FIG. 24, by the allotment to the converters 3 and 47 for signal conversion, the circuit scale and the software program amount required by the converters in the signal processor 38 can be reduced and the signal conversion processing including that in the imaging apparatuses can be speeded up. Needless to say, the profile on the signal processor side and the characteristic of the converter in the imaging apparatus can be corrected.

FIG. 27 shows an example that each of imaging apparatuses 40 to 45 does not include a converter. Needless to say, the above imaging apparatuses may include converters and a plurality of imaging apparatuses 1 may be applied.

Figure 28:
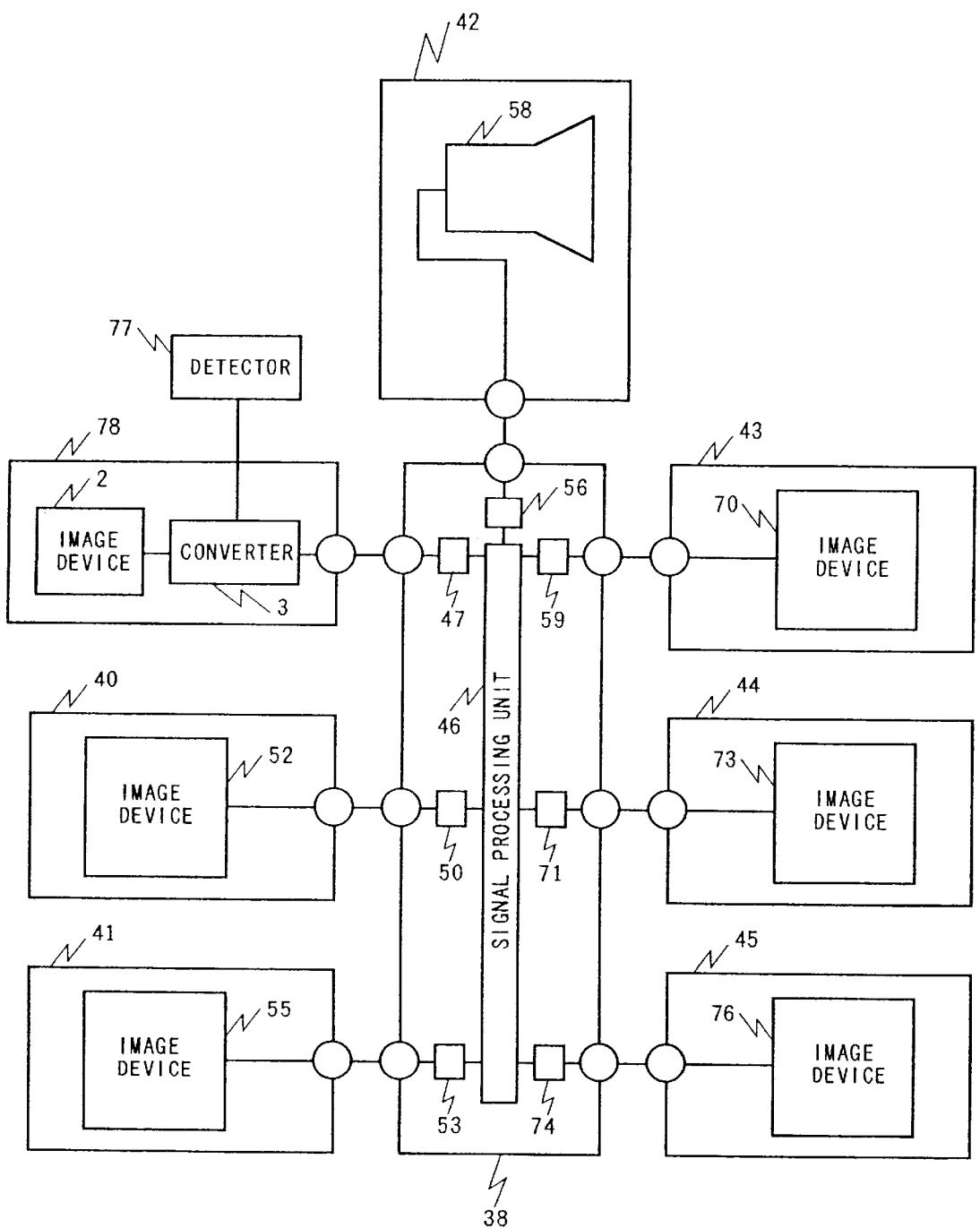
FIG. 28 is a block diagram showing still another embodiment of the present invention in a color matching system.

Still another embodiment of the present invention in a color matching system will be explained with reference to the block diagram shown in FIG. 28. In the embodiment shown in FIG. 28, by using the detector 77 shown in FIG. 26, an imaging apparatus 78 having no detector or an image handled by the imaging apparatus 78 can be detected.

To detect the imaging apparatus 78 or an image handled by the imaging apparatus 78, the detector 77 for the imaging apparatus 78 is placed outside the imaging apparatus 78. By using this configuration, the profile of the imaging apparatus 78 can be corrected and a maximum number of imaging apparatuses can be connected to the signal processor 38.

Finally, an embodiment of the present invention which is suited to obtain equivalent color reproduction (definition of Hunt) which uses the character of a human for recognizing colors by relative color comparison will be explained using an image example handled by the system.

Figure 29:
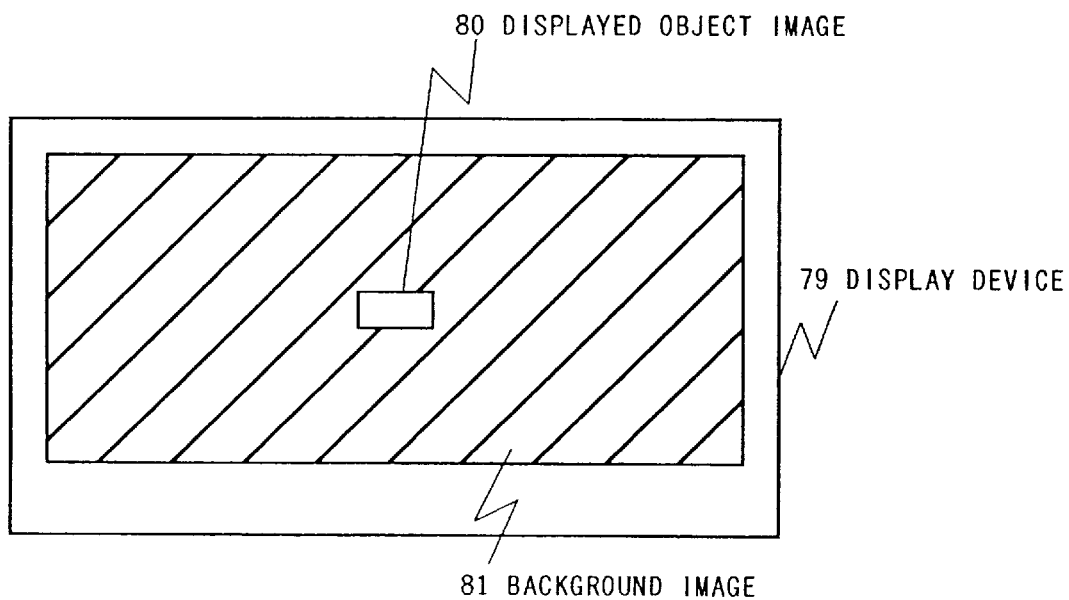
FIG. 29 is an illustration showing a displayed object image 80 and a background image 81 thereof of a display device 79 such as a high vision display.

FIG. 29 shows a displayed object image 80 and a background image 81 thereof of a display device 79 such as a high vision display. By controlling the display device 79 so as to reproduce the color of illuminating light in the actual use environment of an image handled by the display device 79 or a background in which the relative relation between the handled image and background environment thereof can be regarded as equivalent on the background image 81, the above equivalent color reproduction can be obtained. For example, signal conversion such that the above background image is displayed using the converter contained in the display device can be considered.

Figure 30:
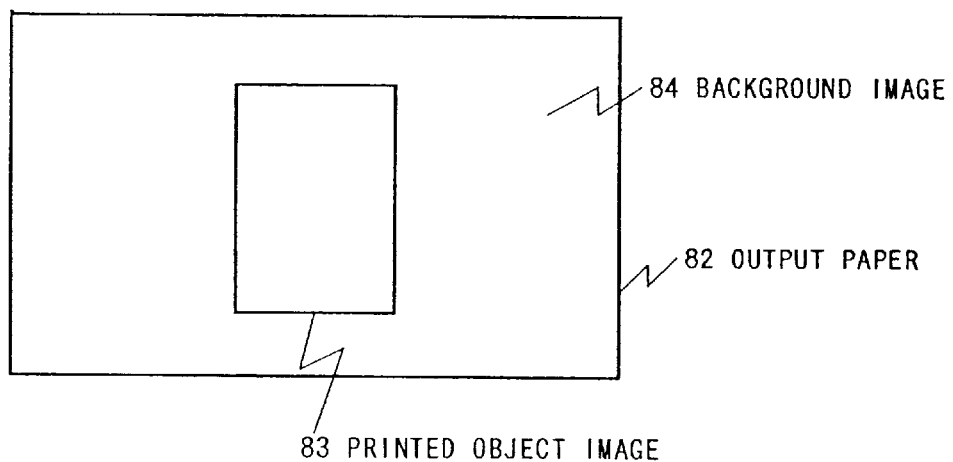
FIG. 30 is an illustration showing a printed object image 83 printed on an output paper 82 of a print device such as a printer and a background image 84 thereof.

FIG. 30 also shows a printed object image 83 which is printed on an output paper 82 of a print device such as a printer and a background image 84 thereof. By controlling the print device so as to reproduce the color of illuminating light in the actual use environment of an image handled by the print device or a background in which the relative relation between the handled image and background environment thereof can be regarded as equivalent on the background image 84, the above equivalent color reproduction can be obtained.

The background image 84 can be obtained by printing the whole base of the printing paper or selecting a most suitable printing paper. For example, a print device for automatically outputting a printed image of about B5 in depth to an A3 paper in width on which the above equivalent background image is printed can be considered.

In the above embodiment which is explained with reference to FIGS. 29 and 30, needless to say, by adding information such as the use environment of an image to the image signal, the color reproduction precision of the present invention will be improved further. Furthermore, by recognizing the wavelength characteristic of illuminating light which is used for image input and executing signal conversion, an image input apparatus such as a scanner or copier can control the image color and background color thereof easily in the image use environment.

As above described in detail, the present invention has the following effects.

By using the present invention, a system which can realize faithful color reproduction and ensure high reliability for color data transfer among light source colors such as displayed colors and non-luminous object colors such as reflected colors and transmitted colors on the monitor display screen can be provided. Therefore, information in the field of an ordering operation using design and video data and the color reproduction characteristic of various imaging apparatuses can be improved.

Furthermore, by applying the present invention, variations in the color reproduction according to variations in the setting status or use environment of an imaging apparatus such as a color display device can be compensated for and a color correction system which realizes faithful color reproduction among a plurality of imaging apparatuses having originally different color reproduction characteristics can be provided.

What is claimed is:

1. A color correction system for an imaging apparatus, comprising:
    at least one of an imaging apparatus for detecting the color of at least one point of an object and an imaging apparatus for outputting image information;
    conversion means for converting the color information of an input-output signal of said imaging apparatus on the basis of the color conversion characteristic of said imaging apparatus;
    reference data means for providing reference data, the reference data being common to a plurality of imaging apparatuses;
    detecting means for detecting at least one value among the color information of an input-output signal of said imaging apparatus, at least one adjustment status set value of said imaging apparatus, and at least one status value indicating at least the variation per year of said color conversion characteristic and the use environment of said imaging apparatus; and
    control means for controlling the color information of the input-output signal of said imaging apparatus by controlling the color conversion characteristic of said conversion means on the basis of an output signal of said detection means and said reference data provided by said reference data means.

2. A color correction system according to claim 1, wherein the color conversion characteristic of said imaging apparatus can be rewritten according to said imaging apparatus.

3. A color correction system according to claim 1, wherein said reference data means includes storage means for storing a reference value of the non-luminous object color of said object; and
    wherein said control means controls the color information on the basis of said stored reference value.

4. A color correction system according to claim 3, wherein the reference value stored in said storage means is a reference value for the light source color for irradiating said object and the non-luminous object color of said object.

5. A color correction system according to claim 1, further comprising:
    detection means only for the use environment of said imaging apparatus.

6. A color correction system according to claim 5, wherein said detection means can be used as detection means for the use environment of said imaging apparatus.

7. A color correction system according to claim 1, further comprising:
    input means for inputting the use environment of said imaging apparatus.

8. A color correction system according to claim 3, wherein the reference value stored in said storage means includes a numerical parameter of the color standard.

9. A color correction system according to claim 8, further comprising:
    means for interpolating the numerical value of the numerical parameter stored in said storage means.

10. A color correction system according to claim 1, further comprising:
    means for generating a warning signal for inputting an image signal which is beyond the color reproduction range of said imaging apparatus into said conversion means or for outputting it from said image output means.

11. A color correction system according to claim 1, wherein said conversion means converts the color information included in an input or output signal to said conversion means so as to compress or expand in order to use the color reproduction range of said imaging apparatus effectively.

12. A color correction system according to claim 3, wherein an input unit of said control means has storage means for storing the reference value for said non-luminous object color and said detection means is detection means for detecting the image color to be outputted to said image output means.

13. A color correction system according to claim 1, wherein the means for outputting said image information is a display.

14. A color correction system according to claim 1, wherein the means for outputting said image information is a print device.

15. A color correction system according to claim 1, wherein the means for outputting said image information can be replaced with another image output device.

16. A color correction system according to claim 4, wherein an input unit of said control means has storage means for storing the reference value for said light source color and non-luminous object color and said detection means is detection means for detecting the image color to be outputted to said image output means.

17. A color correction system according to claim 16, wherein a color fetching device is used as said detection means.

18. A color correction system according to claim 16, wherein said detection means can be replaced with another image input device.

19. A system comprising:
a plurality of color correction systems each according to claim 3, said plurality of color correction systems being used for respective objects; and
signal transmission means for connecting said plurality of color correction systems to each other.

20. A system according to claim 19, wherein at least one of said plurality of color correction systems is an order reception terminal for nonstore retailing.

21. A system according to claim 19, wherein at least one of said plurality of color correction systems is a business support terminal and at least one is a production management terminal so as to realize quick production to order.

22. A system according to claim 19, wherein at least one of said plurality of color correction systems detects image data of non-luminous object color of an object.

23. A color correction system according to claim 3, wherein said control means controls said conversion means so that the component of non-luminous object color included in the color reproduction area of said color correction system is reproduced faithfully in the color space.

24. A color correction system according to claim 1, wherein said conversion means having the predetermined conversion characteristic has at least one of a ROM storing the conversion parameter and an LSI having the conversion function.

25. A color correction system according to claim 2, wherein said detection means detects both the status value indicating the use environment of at least one said imaging apparatus and the color information outputted by an imaging apparatus which outputs said image information.

26. A color correction system according to claim 1, wherein at least one of a signal inputted into said converter and a signal outputted from said converter is a signal corresponding to an optical parameter for which the image color can be determined quantitatively on the basis of the visibility.

27. A color correction system according to claim 1, wherein at least one of a signal inputted into said color correction system and a signal outputted from said color correction system is a signal corresponding to an optical parameter for which the image color can be determined quantitatively on the basis of the visibility.

28. A color correction system according to claim 26, wherein a signal corresponding to the CIE XYZ tristimulus values is used as said optical parameter for which the image color can be determined quantitatively on the basis of the visibility.

29. A color correction system according to claim 26, wherein a signal corresponding to the color defining value in the uniform color space is used as said optical parameter for which the image color can be determined quantitatively on the basis of the visibility.

30. A color correction system according to claim 2, wherein as at least one of a signal which is inputted into said converter and a signal which is outputted from said converter, a signal to which at least one of information on whether the displayed image is a still picture or moving picture, information on a pixel arrangement constituting the displayed image, and information on the constitution of the displayed image is added as added information is used in addition to an image signal.

31. A color correction system according to claim 2, wherein as at least one of a signal which is inputted into said converter and a signal which is outputted from said converter, a signal to which the information for designating an imaging apparatus which is suited to handling said image is added is used in addition to an image signal.

32. A system comprising:
a plurality of color corrections systems each according to claim 1, said plurality of color correction systems being used for respective objects; and
signal transmission means for connecting said plurality of color correction systems to each other.

33. A color correction system according to claim 1, wherein at least one said imaging apparatus comprises an imaging apparatus for detecting the color of at least one point and an imaging apparatus for outputting said image information and said conversion means further comprising:
first conversion means for converting the color information of an output signal of said detecting imaging apparatus; and
second conversion means for converting the color information of a signal to be inputted into said outputting imaging apparatus.

34. A color correction system according to claim 2, further comprising:
signal processing means containing said conversion means;
wherein said signal processing means has said control means for correcting the profile data which decides the color conversion characteristic in said conversion means contained in said signal processing means by detection output of said detection means.

35. A color correction system according to claim 2, further comprising:
signal processing means for processing an input signal into said imaging apparatus for outputting image information;
wherein said signal processing means has said control means for correcting the profile data which decides the color conversion characteristic in said conversion means by detection output of said detection means.

36. A color correction system according to claim 1, further comprising:
display control means for displaying a background image for indicating an actual use environment which is supposed for said displayed image on the background of the displayed image by said outputting imaging apparatus.

37. A color correction system according to claim 2, further comprising:
at least one of print control means for printing a background image for indicating an actual use environment which is supposed for said printed image on the background of the printed image by said imaging apparatus for outputting image information and print control means for selecting a printing paper having a background image for indicating an actual use environment which is supposed for a printed image as a base and printing said printed image.

38. A color correction system according to claim 30, wherein background image information for indicating the actual use environment of said displayed image which is to be displayed on the background of the displayed image of said image outputting means is also added to said signal to which said added information is added and which is used as at least one said signal.

39. A color correction system according to claim 2, wherein said conversion means consists of an integrated circuit containing a non-linear conversion circuit which can exercise electronic control.

40. A color correction system according to claim 2, wherein primary color signals of CMY or CMYK (cyan, magenta, yellow, black) are used as a signal to be inputted into said conversion means.

41. A color correction system for an imaging apparatus, comprising:
- at least one imaging apparatus selected from an imaging apparatus for detecting the color of at least one point of an object and an imaging apparatus for outputting image information;
- first conversion means for converting the color information of an input or output signal of said at least one imaging apparatus on the basis of at least one value among at least one adjustment status set value of said at least one imaging apparatus and at least one status value indicating the use environment of said at least one imaging apparatus;
- second conversion means for converting the color information of said input or output signal on the basis of at least one of the type of a signal to be inputted or outputted into or from said first conversion means and a white balance setting status; and
- signal processing means for controlling said second conversion means.

42. A color correction system according to claim 41, wherein said first conversion means converts said color information furthermore on the basis of the non-linear conversion characteristic of said at least one imaging apparatus.

43. A color correction system for an imaging apparatus, comprising:
- a business support terminal;
- a production management terminal; and
- a transmission path connecting the business support terminal to the production management terminal;
- wherein the business support terminal includes:
- an imaging apparatus for outputting image information;
- inputting means for inputting color information of at least one point of an object to be ordered;
- receiving means for receiving color information from the production management terminal through the transmission path;
- reference data means for providing reference data, the reference data being common to a plurality of imaging apparatuses;
- conversion means for converting at least one of the inputted color information and the received color information based on a color conversion characteristic of the imaging apparatus and the reference data provided by the reference data means;
- outputting means for outputting the converted color information through the imaging apparatus; and
- sending means for sending the inputted color information and required color information related to the object to be ordered to the production management terminal through the transmission path; and
- wherein the production management terminal includes:
- storage means for storing color data for providing color information in accordance with the object to be ordered;
- receiving means for receiving the inputted color information from the business support terminal through the transmission path;
- generating means for generating the required color information by use of the color data stored in the storage means; and
- sending means for sending the generated required color information to the business support terminal through the transmission path.

44. A color correction system for an imaging apparatus, comprising:
- at least one of an imaging apparatus for detecting a color of at least one point of an object and an imaging apparatus for outputting image information;
- conversion means for converting color information of an input signal of the at least one imaging apparatus to an output signal based on a color conversion characteristic of the at least one imaging apparatus, the conversion means including at least one of
  - an exchangeable portable ROM, or a disk storage device, for storing a conversion parameter of the color conversion characteristic, and
  - an exchangeable portable LSI having a conversion function of the color conversion characteristic;
- reference data means for providing reference data, the reference data being common to a plurality of imaging apparatuses;
- detection means for detecting at least one value among an adjustment status set value of the at least one imaging apparatus, and a status value indicating time variation of the color conversion characteristic of the at least one imaging apparatus; and
- control means for controlling the color information of the input/output signal of the at least one imaging apparatus by controlling the color information in the conversion means based on the at least one value detected by the detection means and the reference data provided by the reference data means.

45. A color correction system for an imaging apparatus, comprising:
- at least one of an imaging apparatus for detecting a color of at least one point of an object, and an imaging apparatus for outputting image information;
- built-in conversion means for converting color information of an input signal of the at least one imaging apparatus to an output signal based on profile data of a color conversion characteristic of the at least one imaging apparatus;
- reference data means for providing reference data, the reference data being common to a plurality of imaging apparatuses;
- detection means for detecting at least one value among an adjustment status set value of the at least one imaging apparatus, and a status value indicating time variation of the color conversion characteristic of the at least one imaging apparatus; and
- control means for controlling the color information of the input/output signal of the at least one imaging apparatus by controlling the color information in the conversion means based on the at least one value detected by the detection means and the reference data provided by the reference data means.

* * * * *